（12） United States Patent
Govil et al.

(10) Patent No.: US 9,762,834 B2
(45) Date of Patent: Sep. 12, 2017

(54) CONFIGURABLE HARDWARE FOR COMPUTING COMPUTER VISION FEATURES

(71) Applicant: QUALCOMM Incorporated, San Diego, CA (US)

(72) Inventors: Alok Govil, Fremont, CA (US); Evgeni Petrovich Gousev, Saratoga, CA (US); Soo Youn Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/859,533

(22) Filed: Sep. 21, 2015

(65) Prior Publication Data

US 2016/0091946 A1   Mar. 31, 2016

Related U.S. Application Data

(60) Provisional application No. 62/057,822, filed on Sep. 30, 2014, provisional application No. 62/057,816, filed on Sep. 30, 2014.

(51) Int. Cl.
 *H04N 5/3745* (2011.01)
 *H04N 5/232* (2006.01)
 *G06K 9/60* (2006.01)
(52) U.S. Cl.
 CPC .......... *H04N 5/3745* (2013.01); *G06K 9/605* (2013.01); *H04N 5/23229* (2013.01)
(58) Field of Classification Search
 CPC .. H04N 5/23241; H04N 5/3745; H04N 5/378; H04N 5/23229; G06K 9/00986;
(Continued)

(56) References Cited

U.S. PATENT DOCUMENTS 5,543,590 A   8/1996  Gillespie et al.
6,011,257 A   1/2000  Endoh
(Continued)

FOREIGN PATENT DOCUMENTS

CN    102663409 A     9/2012
DE    102006023611 A1  11/2007
(Continued)

OTHER PUBLICATIONS

Delbruck, T., et al., "Activity-Driven, Event-Based Vision Sensors," Proceedings of 2010 IEEE International Symposium on Circuits and Systems (ISCAS), 2010, 4 pages.
(Continued)

*Primary Examiner* — Dennis Hogue
(74) *Attorney, Agent, or Firm* — Kilpatrick Townsend & Stockton

(57) ABSTRACT

Techniques describe apparatus and method for generating computed results based on sensor readings for detecting features, such as edges, corners etc. The sensor apparatus may include a sensor element array that includes a plurality of sensor elements. The sensor elements may be arranged in a 2-dimensional array, such as columns and rows. The sensor elements may be capable of generating sensor reading based on environmental conditions. The sensor apparatus may include a dedicated computer vision (CV) computation hardware in in-pixel circuitry, peripheral circuitry or dedicated microprocessor coupled to the sensor element array and configured to receive output from one or more of sensor elements. The dedicated CV computation hardware may include configurable blocks for detecting features using CV operations, wherein the configurable blocks may be configured to switch between multiple CV operations, such as linear binary pattern (LBP) and/or histogram of signed gradient (HSG) computer vision operations.

28 Claims, 26 Drawing Sheets

(58) Field of Classification Search
CPC ............ G06K 2009/4666; G06K 9/605; H01L 27/14643; G06F 1/3203; G06F 3/01304
See application file for complete search history.

(56) References Cited

U.S. PATENT DOCUMENTS

| | | | |
|---|---|---|---|
| 7,038,185 | B1 | 5/2006 | Tumblin et al. |
| 7,151,844 | B2 | 12/2006 | Stevenson et al. |
| 8,462,996 | B2 | 6/2013 | Moon et al. |
| 8,902,971 | B2 | 12/2014 | Pace et al. |
| 8,928,793 | B2 | 1/2015 | Mcmahon |
| 2001/0028405 | A1 | 10/2001 | Kondo et al. |
| 2004/0155175 | A1 | 8/2004 | McNulty |
| 2009/0020612 | A1 | 1/2009 | Drzymala et al. |
| 2009/0157707 | A1 | 6/2009 | Ito et al. |
| 2010/0182468 | A1 | 7/2010 | Posch et al. |
| 2011/0128428 | A1 | 6/2011 | Takatoku et al. |
| 2011/0298755 | A1 | 12/2011 | Ni |
| 2012/0138774 | A1 | 6/2012 | Kelly et al. |
| 2012/0313960 | A1 | 12/2012 | Segawa et al. |
| 2013/0054505 | A1 | 2/2013 | Ross et al. |
| 2013/0121590 | A1 | 5/2013 | Yamanaka et al. |
| 2013/0176552 | A1 | 7/2013 | Brown et al. |
| 2014/0003663 | A1 | 1/2014 | Li et al. |
| 2014/0125799 | A1 | 5/2014 | Bos et al. |
| 2014/0149754 | A1 | 5/2014 | Silva et al. |
| 2014/0169663 | A1 | 6/2014 | Han et al. |
| 2014/0319325 | A1 | 10/2014 | Kawahito et al. |
| 2014/0320666 | A1 | 10/2014 | Badawy et al. |
| 2014/0363049 | A1 | 12/2014 | Benosman et al. |
| 2014/0368423 | A1 | 12/2014 | Brenckle et al. |
| 2014/0368626 | A1 | 12/2014 | John Archibald et al. |
| 2014/0368712 | A1 | 12/2014 | Park et al. |
| 2015/0036942 | A1 | 2/2015 | Smirnov et al. |
| 2016/0094800 | A1 | 3/2016 | Gousev et al. |

FOREIGN PATENT DOCUMENTS

| | | |
|---|---|---|
| DE | 102008052930 A1 | 4/2010 |
| EP | 2709066 A1 | 3/2014 |
| JP | 2008131407 A | 6/2008 |
| JP | 2013003787 A | 1/2013 |
| WO | WO-2012093381 A1 | 7/2012 |
| WO | WO-2014015194 A2 | 1/2014 |

OTHER PUBLICATIONS

Etienne-Cummings, R., et al., "A Programmable Focal-Plane MIMD Image Processor Chip", IEEE Journal of Solid-State Circuits, Jan. 2001, vol. 36, No. 1, pp. 64-73.

Hsiao, P.Y., et al., "A Novel CMOS Imager with 2-Dimensional Binarization and Edge Detection for Highly Integrated Imaging Systems," Digest of Technical Papers. International Conference on Consumer Electronics, 2006, pp. 71-72.

Lahdenoja, O., et al., "A Massively Parallel Algorithm for Local Binary Pattern based Face Recognition", IEEE, ISCAS 2006, pp. 3730-3733.

Laiho, M., et al., "Dedicated Hardware for Parallel Extraction of Local Binary Pattern Feature Vectors", 2005 9th International Workshop on Cellular Neural Networks and Their Applications, IEEE, May 2005, pp. 27-30.

Pierzchala, E., et al., "High Speed Field Programmable Analog Array Architecture Design", Analogix Corporation, Feb. 1994, 61 pages.

Poikonen, J., et al., "MIPA4k: A 64x64 Cell Mixed-mode Image Processor Array", ISCAS 2009, IEEE, May 24, 2009, pp. 1927-1930.

Posch, C., et al., "An Asynchronous Time-Based Image Sensor," IEEE International Symposium on Circuits and Systems (ISCAS), 2008, 4 pages.

QUALCOMM, "Fast Corners", Sep. 15, 2015, 6 Slides.

Shi, Y., et al., "Smart Cameras: Fundamentals and Classification," Chapter 2, A.N. Belbachir (Ed.), Springer Science+Business Media, LLC 2010, pp. 19-34.

Stack Overflow, "Fast Detector in every levels on Gaussian Pyramids", matlab, Retrieved from internet, URL:http://stackoverflow.com/questions/24222611/fast-detector-in-every-levels-on-gauss-ian-pyramids , on Sep. 11, 2015, 2 Pages.

Wikipedia, "Features from accelerated segment test", Retrieved from Internet, URL: https://en.wikipedia.org/wiki/Features_from_acceleratedz_segment_test#High-speed$_{13}$ test , on Sep. 11, 2015, 6 Pages.

Wyatt, J.L., et al., "The MIT Vision Chip Project: Analog VLSI Systems for Fast Image Acquisition and Early Vision Processing," IEEE International Conference on Robotics and Automation, 1991, vol. 2, pp. 1330-1335.

Yu, H, "Fast Corner detection—Machine Learning for high speed corner detection", Nov. 16, 2010, 60 Slides.

International Search Report and Written Opinion—PCT/US2015/052068—ISA/EPO—Jan. 8, 2016.

Lahdenoja O., et al., "Extracting Local Binary Patterns with MIPA4k Vision Processor," 12th International Workshop on Cellular Nanoscale Networks and their Applications (CNNA), Feb. 3, 2010, pp. 1-5.

Suarez, M., et al., "CMOS-3D Smart Imager Architectures for Feature Detection", IEEE Journal on Emerging and Selected Topics in Circuits and Systems, vol. 2, No. 4, Dec. 1, 2012, pp. 723-736.

Trein, J. et al., "Development of a FPGA Based Real-Time Blob Analysis Circuit", ISSC 2007, Derry, Sep. 13-14 (6 pages).

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

$$G_y = \begin{bmatrix} -0.3 & -1 & -0.3 \\ 0 & 0 & 0 \\ 0.3 & 1 & 0.3 \end{bmatrix} * I$$

|    | C1 | C2 | C3 |
|----|----|----|----|
| R1 | 7  | 8  | 6  |
| R2 | 9  | 5  | 3  |
| R3 | 3  | 4  | 2  |

FIG. 10A

|    | C1 | C2 | C3 |
|----|----|----|----|
| R1 | 7  | 8  | 6  |
| R2 | 9  | 5  | 3  |
| R3 | 3  | 4  | 2  |

FIG. 10B

|  | C1 | C2 | C3 |
|---|---|---|---|
| R1 | 7 | 8 | 6 |
| R2 | 9 | 5 | 3 |
| R3 | 3 | 4 | 2 |

$$G_X = \begin{bmatrix} -0.3 & 0 & 0.3 \\ -1 & 0 & 1 \\ -0.3 & 0 & 0.3 \end{bmatrix} * I$$

FIG. 13B

$$G_y = \begin{bmatrix} -0.3 & -1 & -0.3 \\ 0 & 0 & 0 \\ 0.3 & 1 & 0.3 \end{bmatrix} * I$$

FIG. 13D

| -2.1 | 0 | 1.8 |
|---|---|---|
| -9 | 0 | 3 |
| -0.9 | 0 | 0.6 |

| -6.6 |
|---|

FIG. 13C

| -2.1 | -8 | -1.8 |
|---|---|---|
| 0 | 0 | 0 |
| 0.9 | 4 | 0.6 |

| -6.4 |
|---|

|    | C1 | C2 | C3 | C4 |
|----|----|----|----|----|
| R1 |    |    |    |    |
| R2 | x  | 1  | x  | x  |
| R3 |    |    |    |    |

$\varphi_3$

FIG. 17B

|    | C1 | C2 | C3 | C4 |
|----|----|----|----|----|
| R1 |    |    |    |    |
| R2 | x  | 12 | 8.9 | 5.4 |
| R3 |    |    |    |    |

$\varphi_2$

FIG. 17A

|    | C1 | C2 | C3 |
|----|----|----|----|
| R1 | 7  | 8  | 6  |
| R2 | 9  | 5  | 3  |
| R3 | 3  | 4  | 2  |

$\varphi_1$

| Detector | Opteron 2.6GHz | | Pentium III 850MHz | |
|---|---|---|---|---|
| | ms | % | ms | % |
| Fast n = 9 (non-max suppression) | 1.33 | 6.65 | 5.29 | 26.5 |
| Fast n = 9 (raw) | 1.08 | 5.40 | 4.34 | 21.7 |
| Fast n = 12 (non-max suppression) | 1.34 | 6.70 | 4.60 | 23.0 |
| Fast n = 12 (raw) | 1.17 | 5.85 | 4.31 | 21.5 |
| Original FAST n = 12 (non-max suppression) | 1.59 | 7.95 | 9.60 | 48.0 |
| Original FAST n = 12 (raw) | 1.49 | 7.45 | 9.25 | 48.5 |
| Harris | 24.0 | 120 | 166 | 830 |
| DoG | 60.1 | 301 | 345 | 1280 |
| SUSAN | 7.58 | 37.9 | 27.5 | 137.5 |

Table 1. Timing results for a selection of feature detectors run on fields (768 × 288) of a PAL video sequence in milliseconds, and as a percentage of the processing budget per frame. Note that since PAL and NTSC, DV and 30Hz VGA (common for webcams) have approximately the same pixel rate, the percentages are widely applicable. Approximately 500 features per field are detected.

http://web.eecs.umich.edu/~silvio/teaching/EECS598_2010/slides/11_16_Hao.pdf

FIG. 23

CONFIGURABLE HARDWARE FOR COMPUTING COMPUTER VISION FEATURES

CROSS REFERENCE SECTION

This application is a non-provisional application and claims the benefit and priority of U.S. Provisional Application No. 62/057,822, filed on Sep. 30, 2014, titled "CONFIGURABLE CIRCUITRY FOR COMPUTING COMPUTER VISION FEATURES," and U.S. Provisional Application No. 62/057,816, filed on Sep. 30, 2014, titled "HARDWARE ACCELERATION OF HISTOGRAM OF SIGNED GRADIENTS FOR COMPUTER VISION," which is herein incorporated by reference in its entirety for all purposes.

BACKGROUND

The present disclosure generally relates to enabling computer vision, and more specifically, improving efficiency for detecting features using computer vision.

Computer vision is a field that includes methods for acquiring, processing, analyzing, and understanding images for use in applications. Traditionally, a processor, coupled to a sensor, acquires image data from a sensor and performs certain computer vision (CV) operations on the information received from the sensor for detecting CV features and consequently objects associated with those features. CV features may include features such as edges, corners, etc. These features may be used in determining macro features, such as faces, smiles and gestures. Programs executing on the processor may utilize the detected features in a variety of applications, such as plane-detection, face-detection, smile detection, gesture detection, etc.

Much effort has been made in recent years to enable computing devices to detect features and objects in the field of view of the computing device. Computing devices, such as mobile devices, are designed with sensitivity towards the amount of processing resources and power used by the mobile device and heat dissipation. However, traditionally, detecting features and objects in the field of view of the computing device, using a camera, requires significant processing resources resulting in higher power consumption and lower battery life in computing devices, such as mobile devices.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIG. 10A illustrates example sensory element readings for performing a histogram of signed gradient (HSG) operations.

FIG. 10B illustrates example sensory element readings for performing linear binary pattern (LBP) operations.

FIGS. 13A, 13B, 13C, 13D and 13E illustrate example methods for generating a histogram of an HSG label for a sensor element.

FIGS. 17A, 17B and 17C illustrate example computations performed for a grid of nine sensor element readings at times $\phi2$ and $\phi3$.

FIG. 23 illustrates example calculation time periods for detecting corners in software.

SUMMARY

Figure 1:
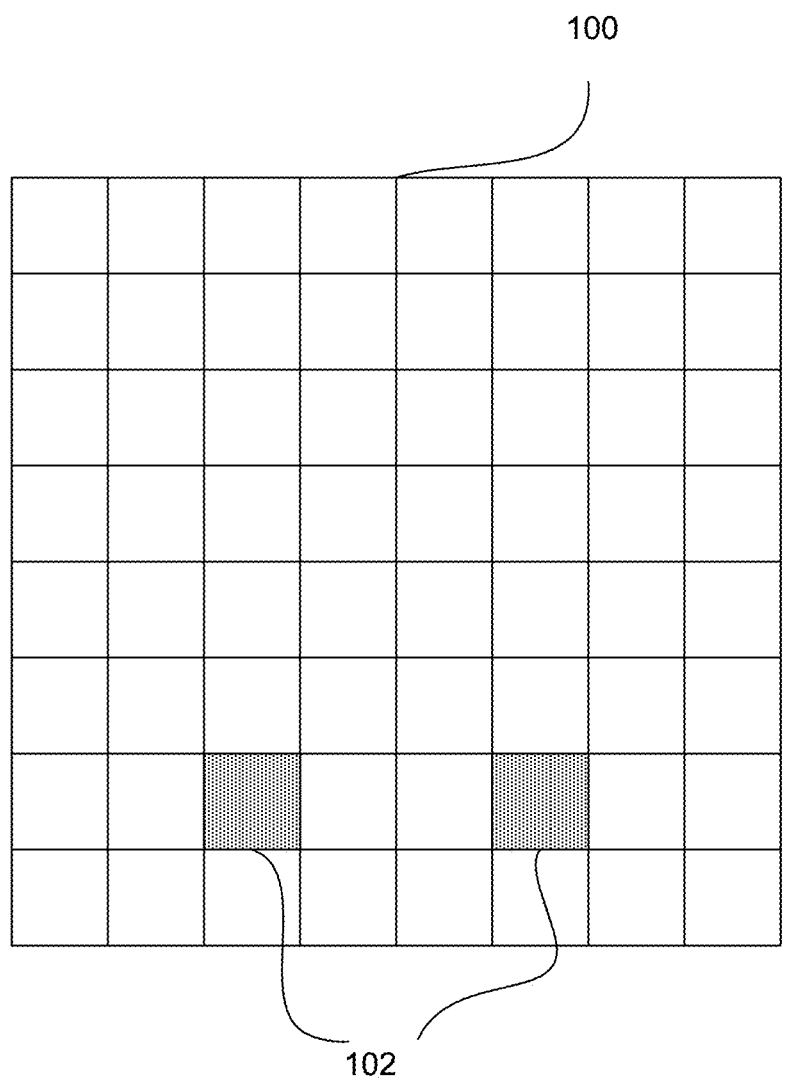
FIG. 1 illustrates an example sensor comprising a plurality of sensor elements arranged in a 2-dimensional array.

The present disclosure generally relates to enabling computer vision, and more specifically, improving efficiency for detecting features using computer vision.

Techniques describe apparatus and method for generating computed results based on sensor readings for detecting features, such as edges, corners etc. The sensor apparatus may include a sensor element array that includes a plurality of sensor elements. The sensor elements may be arranged in a 2-dimensional array, such as columns and rows. The sensor elements may be capable of generating sensor reading based on environmental conditions. The sensor apparatus may also include dedicated computer vision (CV) computation hardware comprising configurable hardware blocks for operating in one mode out of a plurality of modes by switching between modes. In certain embodiments, switching may be performed by using a switch. A switch may include a transistor, multiple transistor switch circuits, or a multiplexer. Each mode may enable the hardware in detecting CV features using a different type of CV feature calculation technique. For example a first mode may be used in calculating CV features for one or more two dimensional (2D) patches using linear binary pattern (LBP) labels, a second mode may be used in calculating the CV features using a histogram of signed gradient (HSG) labels and a third mode may be used in calculating CV features using features from accelerated segment test (FAST) corners. Each 2D patch may include readings from a subset of sensor elements from a sensor element array. In one implementation, the CV features for the sensor readings from the sensor element array for the sensor elements are computed serially by the dedicated CV computation hardware.

An example vision sensor may include a sensor element array comprising a plurality of sensor elements, the sensor elements arranged along at least a first dimension and a second dimension of the sensor element array, each of the plurality of sensor elements capable of generating a signal based on light incident upon the sensor element, and dedicated computer vision (CV) computation hardware capable of receiving image data from the sensor element array and configurable to serially compute CV features for one or more two-dimensional patches within the sensor element array based on signals from sensor elements in each of the one or more two-dimensional patches, the dedicated CV computation hardware including switches to allow the CV computation hardware to calculate a first type of CV feature in a first mode and to calculate a second type of CV feature in a second mode.

An example method may include receiving sensor readings based on light incident upon a plurality of sensor elements forming a sensor element array, wherein the plurality of sensor elements are arranged along at least a first dimension and a second dimension of the sensor element array, determining a mode to operate a dedicated computer vision (CV) computation hardware capable of receiving image data from the sensor element array and configurable to serially compute CV features for one or more two-dimensional patches within the sensor element array based on signals from sensor elements in each of the one or more two-dimensional patches, the dedicated CV computation hardware including switches to allow the CV computation hardware to calculate a first type of CV feature in a first mode and to calculate a second type of CV feature in a second mode, and switching the dedicated CV computation hardware to the first mode or the second mode for computing the corresponding type of CV feature based on the determined mode.

Various other means described in the specification may be utilized by the methods and apparatus discussed above for performing aspects of the disclosure. Furthermore, non-transitory computer-readable storage medium may include instructions executable by a processor for performing various aspects of the disclosure.

In certain aspects of the disclosure, dedicated CV computation hardware may be peripheral to the sensor element array. In some instances, the first type of CV feature may be a Local Binary Pattern (LBP) label, a variation of an LBP label or features from accelerated segment test (FAST) corner. The second type of CV feature may be a second variation of an LBP label, or a Histogram of Signed Gradients (HSG) label. The dedicated CV computation hardware may be coupled to a dedicated microprocessor or an application processor. The dedicated CV computation hardware may include comparators, circuitry for performing a weighted sum operation, and/or charge scaling circuitry. In certain aspects of the disclosure, the dedicated CV computation hardware may be configured to switch to a third mode for calculating the first type of CV feature and the second type of CV feature. A portion of the dedicated CV computation hardware may be bypassed using a bypass path to calculate the first type of CV feature or the second type of CV feature.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Techniques describe apparatus and method for generating computed results based on sensor readings for detecting features, such as edges, corners etc. The sensor apparatus may include a sensor element array that includes a plurality of sensor elements. The sensor elements may be arranged in a 2-dimensional array, such as columns and rows. The sensor elements may be capable of generating sensor readings based on environmental conditions. The sensor apparatus may also include dedicated computer vision (CV) computation hardware comprising configurable hardware blocks for operating in one mode out of a plurality of modes by switching between modes. In certain embodiments, switching may be performed by using a switch. A switch may include a transistor, multiple transistor switch circuits, or a multiplexer. Each mode may enable the hardware in detecting CV features using a different type of CV feature calculation technique.

For example a first mode may be used in calculating CV features for one or more two dimensional (2D) patches using linear binary pattern (LBP) labels, a second mode may be used in calculating the CV features using a histogram of signed gradient (HSG) labels and a third mode may be used in calculating CV features using features from accelerated segment test (FAST) corners. Each 2D patch may include readings from a subset of sensor elements from a sensor element array. In one implementation, the CV features for the sensor readings from the sensor element array for the sensor elements are computed serially by the dedicated CV computation hardware.

In some implementations, the configurable blocks of the dedicated CV computation hardware may include comparators and circuitry for performing weighted sum operations. In one implementation charge scaling circuitry may be used for performing a weighted sum operation. In one implementation, portions of the configuration circuitry may be bypassed using a bypass path to perform certain CV operations. In other implementations, a multiplexer may be used for selecting certain inputs and outputs for performing CV operations.

Configurable blocks may allow the same sensor apparatus and the associated logic/circuitry to be used in different modes to calculate CV features for one or more 2D patches using different techniques. For example, in one implementation, control logic may control the configurable blocks such that HSG operations are performed using the configurable blocks. In another implementation, the control logic may control the configurable blocks such that LBP operations are performed using the configurable blocks. In one implementation, the modes or the values in the control logic may be stored in SRAM for performing operations in different modes. Although the disclosure discusses generating HSG and LBP labels and FAST corner detection, similar techniques may be used for generating different types of CV features without deviating from the scope of the disclosure.

For example, in certain implementations, different types of CV features may also include variations of the computing LBP label. Such variations may include (CS)-LBP, where the central pixel/block is not considered and all opposing corners/edges around the central block are compared and 4 comparison labels are generated as a result, which then represents the LBP label, and is used in the same way as previously described LBP. Other variations include, but are not limited to "patch-symmetric" LBP (where center pixel/block is not considered in the comparison but an average of the entire 3×3 patch is computed, and then each edge/corner is compared to the average) and "local tertiary pattern (LTP)," (a variation of LBP that can include results +1, 0, and −1—not just 1 or zero; zero meaning difference is below a threshold, and +1 and −1 meaning difference is greater than a threshold but also takes into account whether the sign of the difference).

A sensor may include a sensor element array of a plurality of sensor elements. The sensor element array may be a 2-dimensional array that includes sensor elements arranged in two dimensions, such as columns and rows, of the sensor element array. Each of the sensor elements may be capable of generating a sensor reading based on environmental conditions. In certain implementations, the sensor may be a vision sensor and may generate sensor readings based on light incident upon the sensor elements. FIG. 1 illustrates an example sensor 100 comprising a plurality of sensor elements arranged in a 2-dimensional array. In FIG. 1, the illustration of the sensor 100 represents 64 (8×8) sensor elements in the sensor element array. In various implementations, the shape of the sensor elements, the number of sensor elements and the spacing between the sensor elements may vastly vary, without departing from the scope of the invention. Sensor elements 102 represent example sensor elements from a grid of 64 sensor elements.

Figure 2:
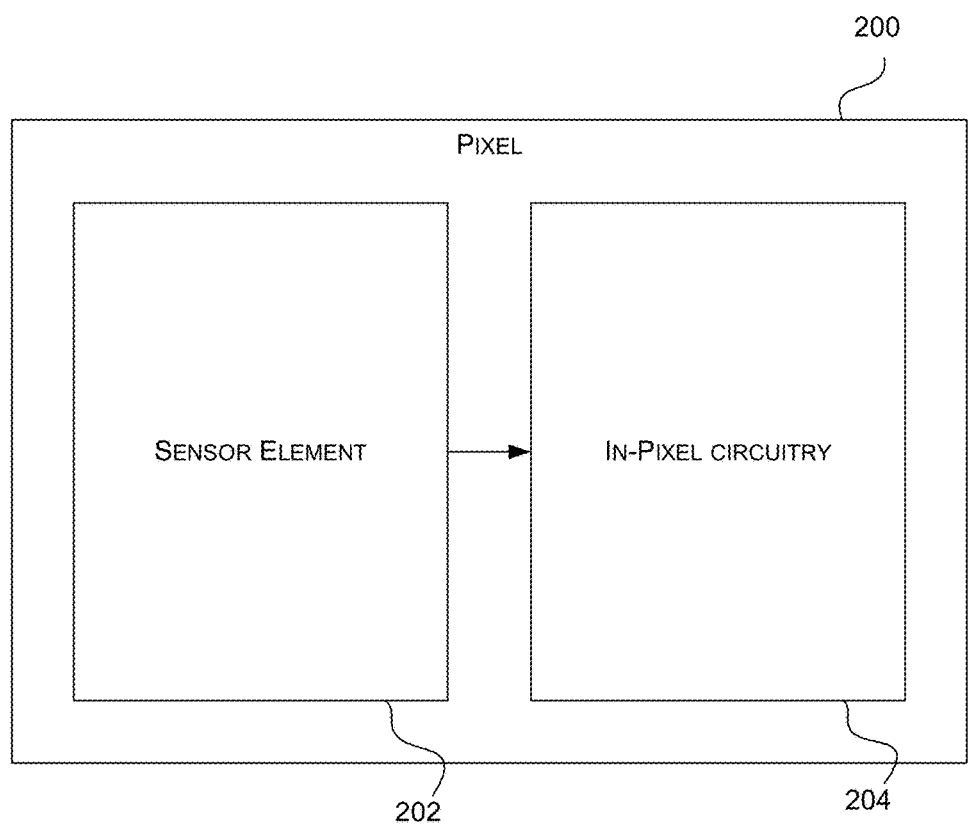
FIG. 2 illustrates an example pixel comprising a sensor element and in-pixel circuitry.

In certain implementations, the sensor elements may have dedicated CV computation hardware implemented as in-pixel circuitry (computation structure) coupled to the sensor element. In some implementations, the sensor element and the in-pixel circuitry together may be referred to as a pixel. The processing performed by the in-pixel circuitry coupled to the sensor element may be referred to as in-pixel processing. In some instances, the sensor element array may be referred to as the pixel array, the difference being that the pixel array includes both the sensor elements and the in-pixel circuitry associated with each sensor element. FIG. 2 illustrates an example pixel 200 with a sensor element 202 and in-pixel circuitry 204. In certain implementations, the in-pixel circuitry 204 may be analog circuitry, digital circuitry or any combination thereof.

Figure 3:
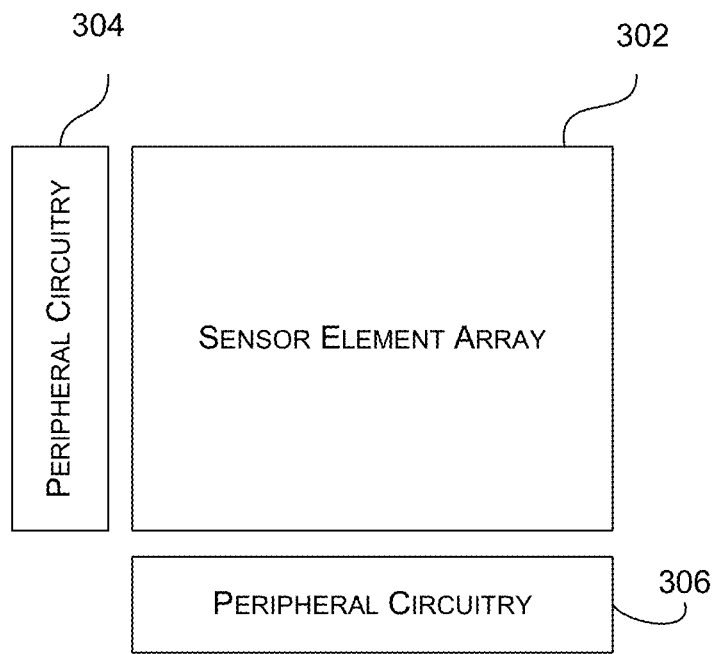
FIG. 3 illustrates an example peripheral circuitry coupled to sensor element array.

In certain implementations, the sensor element array may have dedicated CV computation hardware implemented as peripheral circuitry (computation structure) coupled to a group of sensor elements. Such peripheral circuitry may be referred to as on-chip sensor circuitry. FIG. 3 illustrates an example peripheral circuitry (304 and 306) coupled to the sensor element array 302.

Figure 4:
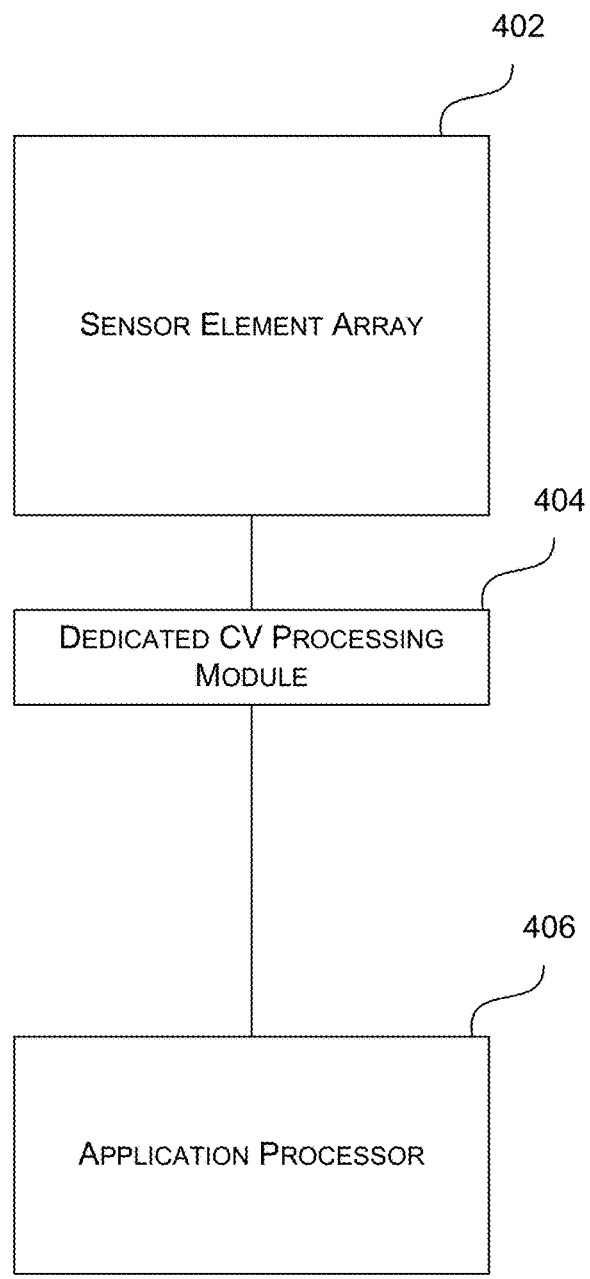
FIG. 4 illustrates an example sensor element array coupled to a dedicated CV processing module.

Furthermore, as shown in FIG. 4, in certain implementations, the sensor element array may have dedicated CV computation hardware implemented as dedicated CV processing module 404 coupled to the sensor element array 402 and implemented using an Application Specific Integrated Circuit (ASIC), Field Programmable Gate Array (FPGA), embedded microprocessor, or any similar analog or digital computing logic for performing aspects of the disclosure. In certain implementations, the dedicated CV computation hardware implemented as dedicated CV processing module 404 may be configured to execute instructions stored on a non-transient computer readable medium for calculating CV features.

It should be noted that at least in certain implementations, the dedicated CV processing module 404 is in addition to an Application Processor 406 and not instead of the Application Processor 406. For example, the dedicated CV processing module 404 may process and/or detect computer vision features, whereas the Application Processor 406 may receive indications of these detected computer vision features and pattern match against previously stored images or reference indicators to determine macro-features, such as smiles, faces, objects, etc. In addition, the Application Processor 406 may be relatively vastly more complex, compute-intensive, power-intensive and responsible for executing system level operations, such as operating system operations, implement the user interface for interacting with the user, perform power management for the device, manage memory and other resources, etc. The Application Processor 406 may be similar to processor(s) 2510 of FIG. 25.

Furthermore, aspects of the invention may be implemented in in-pixel circuitry, peripheral circuitry or in dedicated CV processing module or in any combination thereof. Also, aspects of the invention may be implemented in analog domain and/or digital domain or any combination thereof.

As described herein, the dedicated CV computation hardware computes CV features or localized CV features for each of the subject sensor elements based on, at least in part, signals associated with a plurality of neighboring sensor elements in proximity to the subject sensor element.

As described herein, the sensor elements relatively close to the subject sensor element may be referred to as neighboring sensor elements. In certain aspects of the disclosure, the neighboring sensor elements may include sensor elements immediately adjacent to the subject sensor element. In certain other aspects of the disclosure, neighboring sensor elements may also include sensor elements that are relatively close to the subject sensor element and not immediately adjacent. For example, in certain instances, sensor elements within three sensor elements from the subject sensor element may still be considered neighboring sensor elements when the width or height of the number of sensors is sixty-four sensor elements.

As described herein, CV features or localized CV features may refer to detecting low level CV markers or indicators, such as labels associated with each sensor element or pixel of the sensor. For example, a label may include an LBP label for a sensor element. An LBP label for a sensor element may be generated by comparing the sensor readings of the sensor element and some of its neighboring sensor elements. An LBP label may indicate if the CV feature from the reference of the sensor element represents an edge, corner, curve, spot, etc. Other techniques such as HSG, FAST corner detection or other suitable variants of LBP may be used for detecting CV features without deviating from the scope of the disclosure.

According to aspects of the disclosure, a variety of different sensors may be improved according to aspects of the current disclosure. Example sensors may include light sensors, olfactory sensors and/or chemical sensors. Although light sensors are discussed throughout the disclosure, similar techniques may be employed in other types of sensors without deviating from the scope of the invention.

Figure 5:
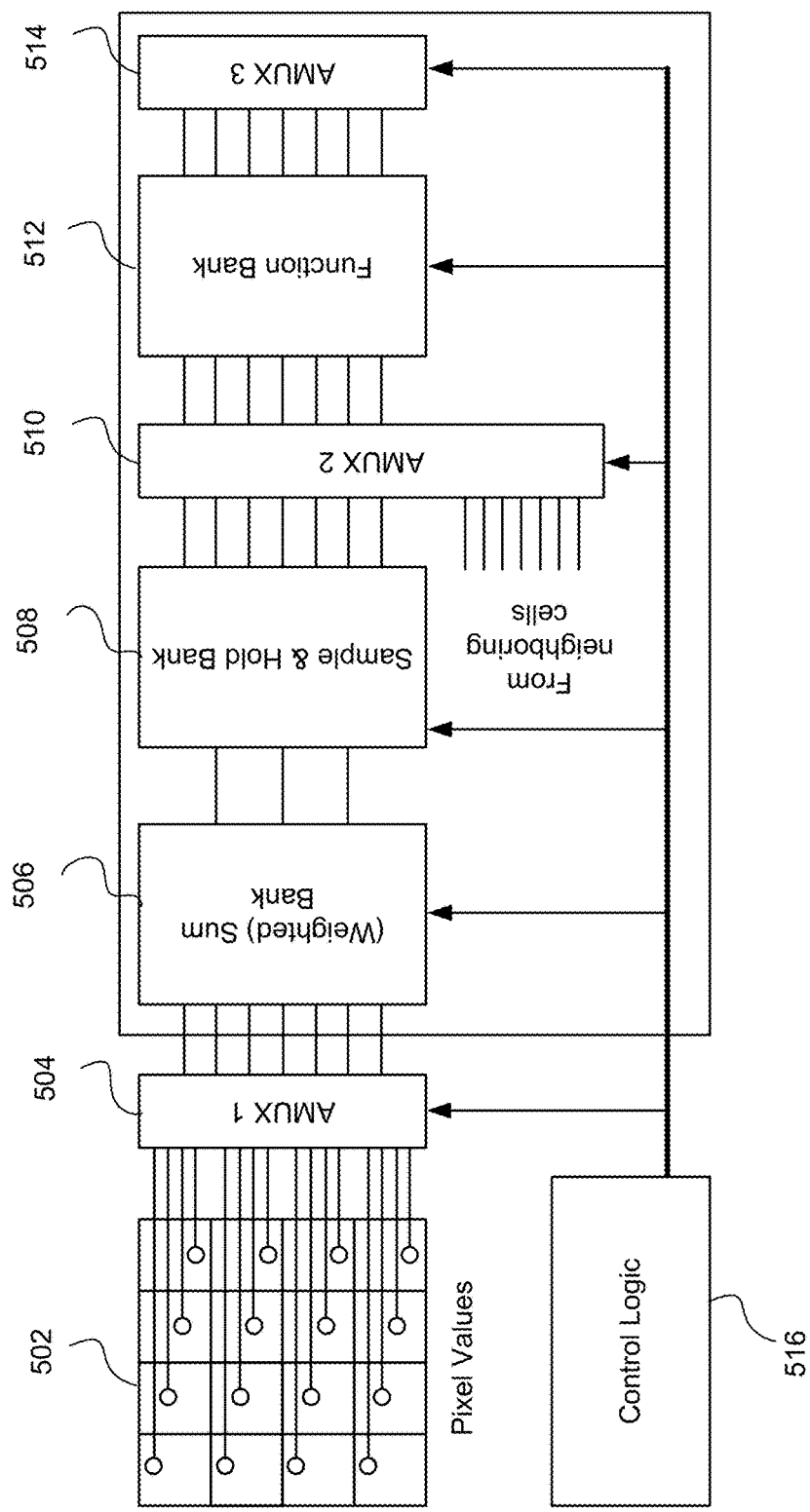
FIG. 5 illustrates an example sensor element array comprising configurable blocks.

FIG. 5 illustrates an example sensor apparatus comprising sensor elements 502, control logic 516, and configurable blocks 504-514. In one implementation, as shown in FIGS. 2, 3, and 4, the dedicated CV computation hardware comprising the configurable blocks may be implemented in in-pixel circuitry 204, peripheral circuitry 304, dedicated CV processing module 404 or any combination thereof. Example circuitry in FIG. 5 includes a first multiplexer 504 (MUX 1), a sum bank 506, sample and hold bank 508, a second multiplexer 510 (MUX 2), a function bank 512 and a third multiplexer 514 (MUX 3). In some implementations, the sum bank 506 may be a weighted sum bank. Each bank may optionally have bypass paths. In certain modes, multiplexers may be configured to connect reference voltages or ground to the outputs. By implementing intermediary multiplexes and bypassing certain blocks, several combinations of circuitry may be enabled to perform various operations, both serially or in parallel.

Configurable blocks may allow the same sensor apparatus and the associated blocks to be used in different modes to calculate different types of CV features for one or more 2D patches using different computation techniques. For example, in one implementation, control logic 516 may control the blocks such that HSG operations are performed using the configurable blocks. In another implementation, the control logic 516 may control the blocks such that LBP labels are generated using the configurable blocks. In one implementation, the modes or the values in the control logic may be stored in static random access memory (SRAM) or any other suitable storage buffer for performing operations in different modes.

In certain implementations, CV features, such as LBP or HSG labels or FAST corners, may be generated, using the configurable blocks discussed in FIG. 5, serially for each of the sensor elements from a plurality of sensor elements. For example, referring to FIG. 4, the sensor readings may be received by the dedicated CV processing module 404. The dedicated CV processing module 404 may serially generate labels for each of the sensor elements using the sensor readings from the subject sensor element and the corresponding group of sensor elements. In certain embodiments, serially generating the labels may allow for selectively generating labels for only the sensor readings that have events. Additionally, serially generating the labels allows for reducing the hardware required for generating the labels, since the same hardware is used for generating multiple labels in sequence. With the advance in processing technology, simple additions and comparison computations, that are needed for calculating such types of CV features, can be performed at high speeds serially alleviating partially certain speed concerns in generating the labels serially.

Figure 6:
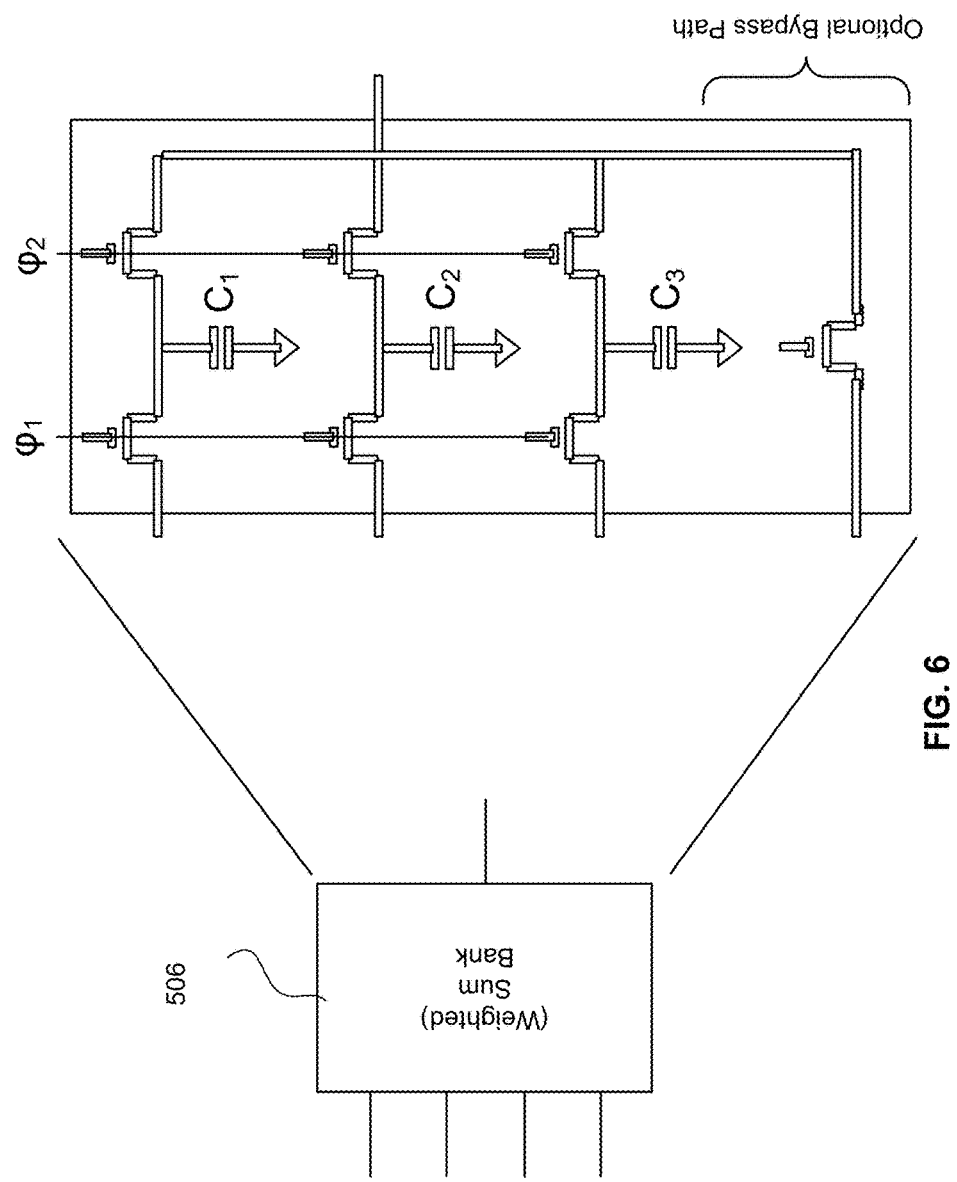
FIG. 6 illustrates an example sum bank block shown in FIG. 5, according to aspects of the disclosure.

FIG. 6 illustrates an example sum bank shown in FIG. 5, according to aspects of the disclosure. In one implementation, the sum bank 506 may include several switches and capacitors, as depicted in FIG. 6. A switch may include a transistor, multiple transistor switch circuits, or a multiplexer.

In one implementation, during $\phi 1$, input voltages may be written onto the capacitors. During $\phi 2$, capacitors may be shorted together to compute a weighted average that may be available at the output line. The capacitors may be different or equal in values. In one implementation, as shown in FIG. 6, an optional bypass path may be included to bypass the capacitors and the summing operation. In certain implementations, the optional bypass path may be selected using the multiplexer, by programming the appropriate values in the control logic 516.

Figure 7:
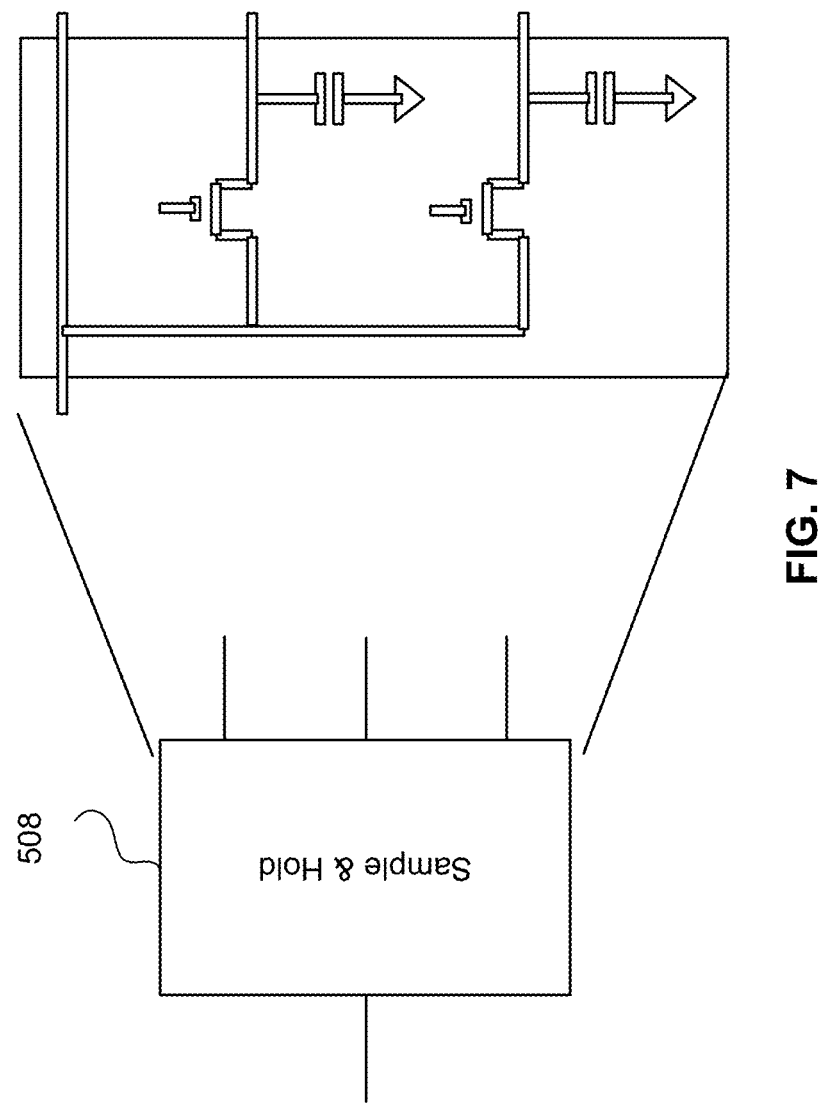
FIG. 7 illustrates an example of the sample and hold block shown in FIG. 5, according to aspects of the disclosure.

FIG. 7 illustrates an example sample and hold block 508 shown in FIG. 5, according to aspects of the disclosure. In one implementation, the sample and hold block 508 may include several switches and capacitors, as depicted in FIG. 7. A switch may include a transistor, multiple transistor switch circuits, or a multiplexer.

In one implementation, the input value to the sample and hold block 508 may be cached at time $t_1$ using capacitors. At a later time $t_2$, the values stored in the sample and hold block 508 may be forwarded by switching to the bypass path. The subsequent circuitry can compare the old and current values to produce temporal contrast between the two values.

Figure 8:
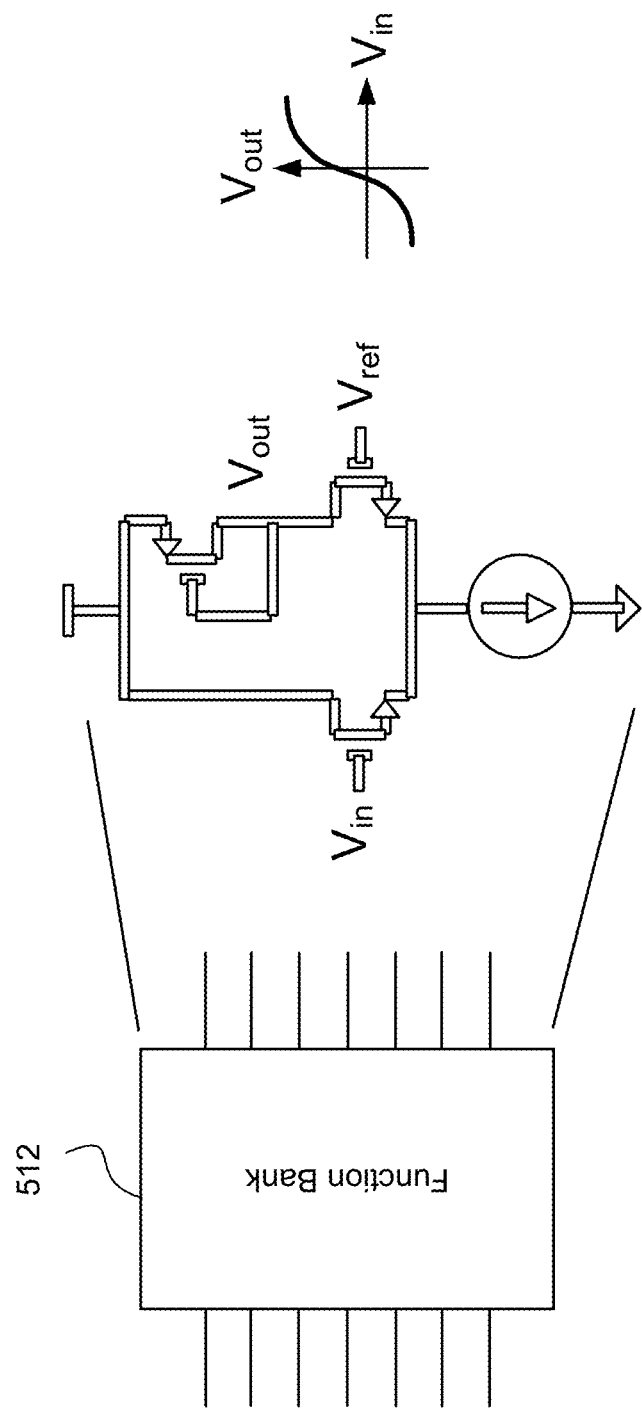
FIG. 8 illustrates an example of the function bank shown in FIG. 5, according to aspects of the disclosure.

FIG. 8 illustrates an example function bank shown in FIG. 5, according to aspects of the disclosure. The function block 512 may provide logic for one or more functions. Example functions may include comparators, maximum, winner-takes-all, minimum, loser-takes-all functions. As shown in FIG. 8, in one example implementation, the function block may include non-linear (e.g., Rectifier/ReLu (Rectified Linear Unit)) and sigmoid amplifiers.

Figure 9:
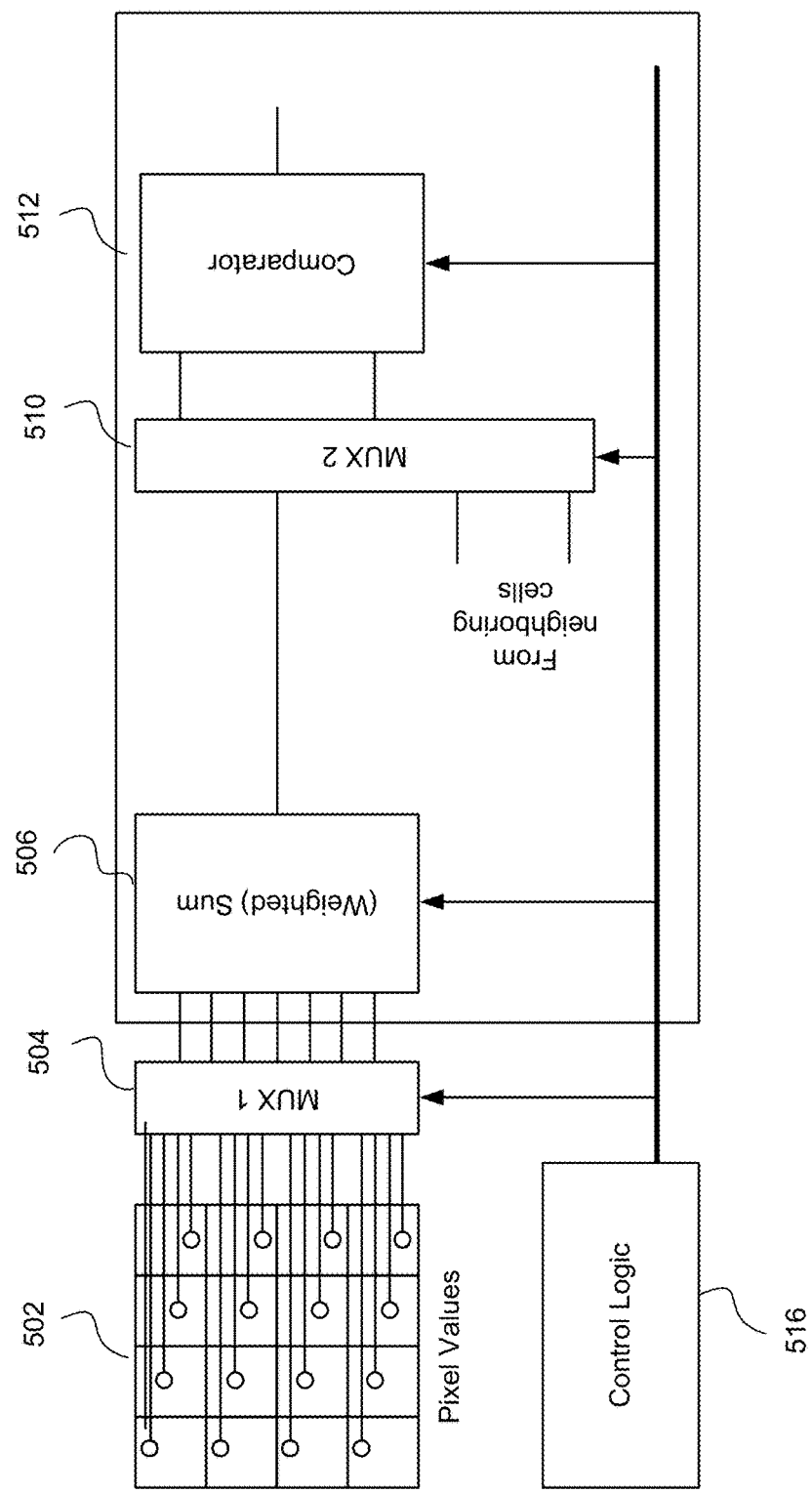
FIG. 9 illustrates an example selected configuration for the configurable block described in FIG. 5.

FIG. 9 illustrates an example selected configuration for the configurable blocks described in FIG. 5. In contrast to FIG. 5, some of the blocks shown in FIG. 9 act in a specific manner configured through the control logic 516. Again, in contrast to FIG. 5, some blocks are not shown in FIG. 9 since those blocks have been configured in such a manner to act as if they do not appear in the signal path by deselecting those blocks or configuring them such that they act as forward through logic (e.g., using bypass logic).

Specifically, FIG. 9 is configured to perform HSG operations. The multiplexers (504 and 510) may be configured to switch the operation of the configurable block to perform HSG operations. The weighted sum bank 506 may operate as a single weighted sum block. As shown in FIG. 6, the weighted sum bank 506 may have three inputs with capacitor values 1C, 3C and 1C, respectively. The sample and hold block 510 is not shown and may be configured to act as a forward through or bypass block. The function bank 512 may be configured as a comparator.

As shown in FIG. 10A, an HSG CV feature for a 2D patch may be calculated using the example circuitry from FIG. 9. For example, FIG. 10A illustrates sensed readings for sensor elements and the gradient coefficients for an HSG operation organized in a 2-D matrix. The configurable circuitry may be configured such, using control logic 516, to calculate HSG CV features. For calculating the HSG label associated with R2C2, the values from the neighboring sensor elements/pixels R1C1 (3), R1C2 (4) and R1C3 (2) may be selected as input to the weighted sum bank using MUX 504. Similarly and simultaneously, circuitry in an adjacent pixel or peripheral area may select R3C1, R3C2 and R3C3 using MUX 504 for calculating the respective weighted sum of that row.

Furthermore, MUX 510 may be configured to pass through the weighted sums of the rows to the comparators to compare the weighted sum from the first row with the weighted sum from the third row generated by the weighted sum bank 506 to provide the Gy component for determining the HSG label. Similarly, the vertical gradient component and/or the diagonal gradient component may be generated using the same circuitry by selecting the appropriate blocks using the control logic 516.

Figure 10B:
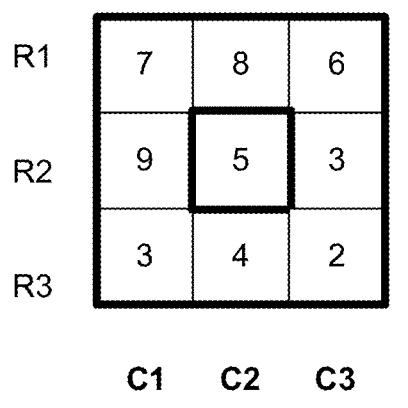

As shown in FIG. 10B, the same circuit shown in FIG. 5 may also be used for calculating LBP CV features for one or more 2D patches without using bypass paths. For example, for comparing R2C2 and R1C1, the above circuitry may be configured to select R1C1 using MUX 504 as input to the weighted sum bank 506 and grounding the other inputs. Similarly and simultaneously, circuitry in an adjacent pixel or peripheral area may select R2C2. Furthermore, MUX 510 may be configured to select R1C1 and R2C2 to send to the comparator for comparison. Similarly, in one implementation, the other pixels may be compared against the value of R2C2 to generate the LBP label for R2C2, using the same circuit (that was used for other comparisons as well as for HSG calculations).

In one variation of the circuitry described in FIG. 5, a bypass path may be implemented for the weighted sum bank 506. Furthermore, the circuitry may include three inputs with capacitors 1C, 3C and 1C, respectively. Since the HSG calculations utilize the weighted sum, the control logic 516 may be similar or the same to what has been described in FIG. 9 for generating the HSG labels. However, for generating LBP labels, where weighted sums are not used, the bypass path may be used to avoid weighing the intensity voltage. In the example described in FIG. 10B, the R1C1 pixel value may bypass the weighted sum bank 506 and be selected to be compared at the comparator. In one implementation, the other three inputs of the weighted sum circuit 506 are grounded.

Besides LBP labels discussed above, different types of CV features may also include variations of the computing LBP label. Such variations may include (CS)-LBP, where the central pixel/block is not considered and all opposing corners/edges around the central block are compared and 4 comparison labels are generated as a result, which then represents the LBP label, and is used in the same way as previously described LBP. Other variations include, but are not limited to "patch-symmetric" LBP (where center pixel/block is not considered in the comparison but an average of the entire 3×3 patch is computed, and then each edge/corner is compared to the average) and "local tertiary pattern (LTP)," (a variation of LBP that can include results +1, 0, and −1—not just 1 or zero; zero meaning difference is below a threshold, and +1 and −1 meaning difference is greater than a threshold but also takes into account whether the sign of the difference).

Figure 11:
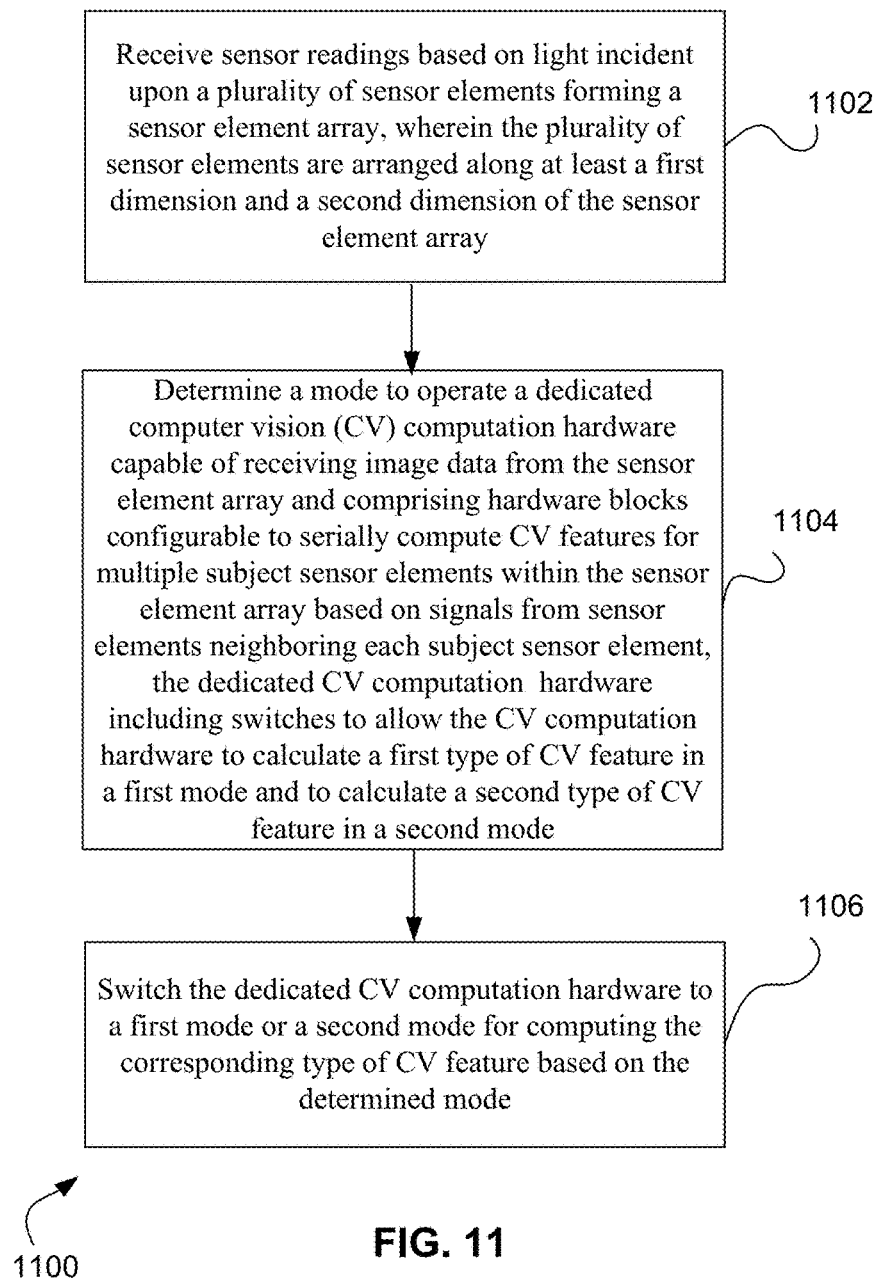
FIG. 11 is an example flowchart, according to certain aspects of the disclosure.

FIG. 11 is an example flowchart, according to certain aspects of the disclosure. Some or all of the process 1100 (or any other processes described herein, or variations and/or combinations thereof) may be performed by circuitry or logic. The circuitry or logic may be implemented in the in-pixel circuitry, peripheral circuitry or dedicated CV processing module, or any combinations thereof. In some instances all or portions of the logic may be implemented using instructions, executed on the digital circuitry and stored on a non-transitory computer readable medium.

At block 1102, components of the sensor apparatus receive sensor readings based on light incident upon a plurality of sensor elements. The plurality of sensor elements form a sensor element array. Furthermore, the plurality of sensor elements are arranged along at least a first dimension and a second dimension of the sensor element array.

At block 1104, components of the sensor apparatus determine a mode to operate a dedicated CV computation hardware capable of receiving image data from the sensor element array and comprising hardware blocks. The hardware blocks may be configurable to serially compute CV features for one or more 2D patches comprising multiple subject sensor elements within the sensor element array based on signals from sensor elements in each of the one or more 2D patches. The dedicated CV computation hardware may include switches to allow the CV computation hardware to calculate a first type of CV feature for a 2D patch in a first mode and to calculate a second type of CV feature for a 2D patch in a second mode.

In certain implementations, CV features, such as LBP or HSG labels or FAST corners, may be generated/detected, using the configurable blocks discussed in FIG. 5 or other figures, serially for each of the sensor elements from a plurality of sensor elements. For example, referring to FIG. 4, the sensor readings may be received by the dedicated CV processing module 404. The dedicated CV processing module 404 may serially generate labels for each of the sensor elements using the sensor readings from the subject sensor element and the corresponding group of sensor elements. In certain embodiments, serially generating the labels may allow for selectively generating labels for only the sensor readings that have events. Additionally, serially generating the labels allows for reducing the hardware required for generating the labels, since the same hardware is used for generating multiple labels in sequence. With the advance in processing technology, simple additions and comparison computations, that are needed for calculating such types of CV features, can be performed at high speeds serially alleviating partially certain speed concerns in generating the labels serially.

The dedicated CV computation hardware may be implemented in in-pixel circuitry 204, peripheral circuitry 304, dedicated CV processing module 404 or any combination thereof. The first type of CV feature and the second type of CV feature may be distinct from each other may be one of generating/detecting LBP labels, HSG labels, FAST corners or other types of CV features.

In certain embodiments, the dedicated CV computation hardware may comprise comparators, weighted sum of operations, AND gates, OR gates and/or charge scaling circuitry. In certain implementations, bypass logic may be used to switch from one mode to another mode.

At block 1106, components of the sensor apparatus switch the dedicated CV computation hardware to a first mode or a second mode for computing the corresponding type of CV feature based on the determined mode.

It should be appreciated that the specific steps illustrated in FIG. 11 provide a particular method of switching between modes of operation, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 11 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

Aspects of the disclosure discussed above enable computing CV features using HSG operations and also switch between calculating CV features using HSG and LBP. FIGS. 12-21 disclose additional techniques for accelerating computation of HSG for computer vision.

Hardware Acceleration of HSG Computations for CV Features

In addition to the techniques described in the figures above, additional techniques are described for generating HSG labels for sensor readings from sensor elements. An apparatus and method are described for detecting features, such as edges, corners etc., by generating computed results based on sensor readings. Dedicated CV computation hardware is described for generating an HSG label for each of the sensor elements, by comparing weighted summations for two groups of neighboring sensor elements.

Methods and apparatus are described for generating computed results based on sensor readings. The sensor reading may be from a sensor element array comprising a plurality of sensor elements. The sensor elements may be arranged along at least a first dimension and a second dimension of the sensor element array. Each of the sensor elements may be capable of generating a sensor reading based on environmental conditions. The apparatus for performing the methods may include dedicated CV computation hardware. The dedicated CV computation hardware may be implemented in-pixel circuitry 204 coupled to the sensor element, peripheral circuitry 304 coupled to the sensor element array or a dedicated CV processing module 404 and configured to receive output from the plurality of sensor elements. The dedicated CV computation hardware may include computation structure configured to generate an HSG label for each of the sensor elements, by comparing weighted summations for two groups of neighboring sensor elements. In certain embodiments, the computation structure may include three capacitors with each receiving a voltage applied from the neighboring sensor elements. In certain other embodiments, the computation structure comprises charge scaling circuitry for multiplying and summing the voltage from three neighboring sensor elements. In certain other embodiments, the computation structure comprises computing the sum of the gradient for only three neighboring sensing elements and reusing the sum of the sensing elements for an additional three neighboring elements to generate the HSG label for the referenced sensor element. The HSG labels may be generated for each of the sensor elements for detecting edges for a computer vision application.

Figure 12:
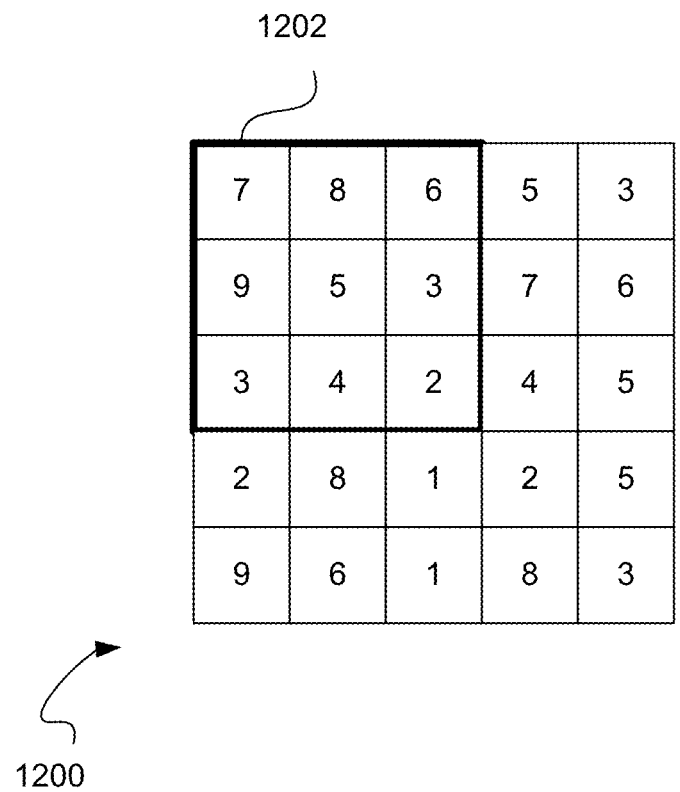
FIG. 12 illustrates a plurality of sensor readings from a sensor array depicting a frame of an image.

FIG. 12 illustrates a group of sensor readings from a sensor element array depicting a frame of an image 1200. In some instances, each sensor reading from the sensor element array may be referred to as an image pixel value. Each portion of the image may include values from a plurality of sensor elements. In one implementation, a histogram may be generated for a plurality of sensor elements, such as the sensor elements for block 1202. Such a histogram may represent certain macro-features and information about the plurality of sensor elements 1202. The histogram may be analyzed based on statistics or heuristics for identifying a feature from the plurality of sensor readings 1202. In one implementation, the histograms may be matched against stored histograms.

In one implementation, HSG may be used for generating the values associated with the sensor readings for the histogram. FIGS. 13A-E, FIGS. 14 and 15A and 15B illustrate example techniques for determining an HSG label for a sensor element. FIG. 16 describes generating a histogram using such HSG labels.

FIG. 13A illustrates several example image pixel values sensed by the sensory elements, with a center image pixel value "5" (R2C2) with eight neighboring image pixel values. The values shown in FIG. 13A are the same image pixel values shown as block 1202 in FIG. 12 from the frame of sensor readings for an image 1200. An HSG label may be generated for each sensory element location. The following steps (13B-13E, 14A and 14B) describe the process of generating an HSG label for R2C2 (i.e., 1302) from FIG. 13A.

FIG. 13B illustrates an example 2-dimensional vertical edge detection matrix comprising gradient coefficients for the x-axis. In FIG. 13B, block 1202 represents I and each value shown in block 1202 is multiplied by the corresponding value from the 2D vertical edge detection matrix shown in FIG. 13B. The resulting values from the multiplication are shown in the 2D array in FIG. 13C. For example, the value at R1C1 (i.e. "7") from FIG. 13A is multiplied by −0.3 from Gx of FIG. 13B, resulting in −2.1 in the location at FIG. 13C which corresponds to R1C1 from FIG. 13A. Similarly, R2C3 (i.e., "3"), from FIG. 13A, is multiplied by 1 from Gx of FIG. 13B, resulting in 3 in the location at FIG. 13C corresponding to R2C3 from FIG. 13A. All the values shown in FIG. 13C are summed together to give the final value or sum of the gradients (i.e., −6.6).

FIG. 13D illustrates an example 2-dimensional horizontal edge detection matrix comprising gradient coefficients for the y-axis. In FIG. 13D, block 402 represents I and each value shown in block 402 is multiplied by the corresponding value from the 2D horizontal edge detection matrix shown in FIG. 13D. The resulting values from the multiplication are shown in the 2D array in FIG. 13E. For example, the value at R1C1 (i.e. "7") from FIG. 13A is multiplied by −0.3 from Gy of FIG. 13D, resulting in −2.1 in the location at FIG. 13E which corresponds to R1C1 from FIG. 13A. Similarly, R2C3 (i.e., "3"), from FIG. 13A, is multiplied by 0 from Gx of FIG. 13D, resulting in 0 in the location at FIG. 13E corresponding to R2C3 from FIG. 13A. All the values shown in FIG. 13E are summed together to give the final value or sum of the gradients (i.e., −6.4).

Figure 14:
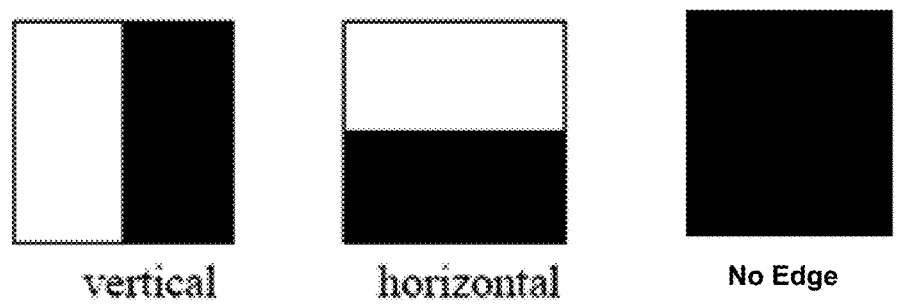
FIG. 14 illustrates a detected vertical edge, horizontal edge and no edge.
Figure 15A:
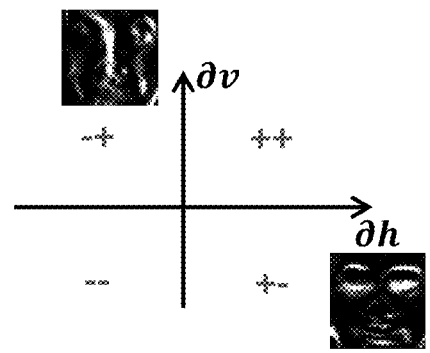
FIGS. 15A and 15B illustrate generating an HSG label.

FIG. 14 illustrates a vertical edge feature, horizontal edge feature and no edges detected for a sensor element location. Each edge sign component may either be positive or negative. Consequently, there are four possibilities for each pixel for two direction edges. For example, as shown in FIG. 15A, a negative value detected for Gx and a positive value detected for Gy for a sensor element may associate the sensor element location with top left quadrant. Similarly, a positive value detected for Gx and a negative value detected for Gy for a sensor element may associate the sensor element location with the bottom right quadrant.

Figure 15B:
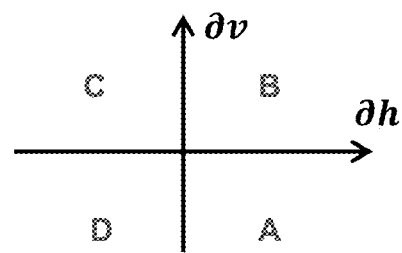
Figure 16:
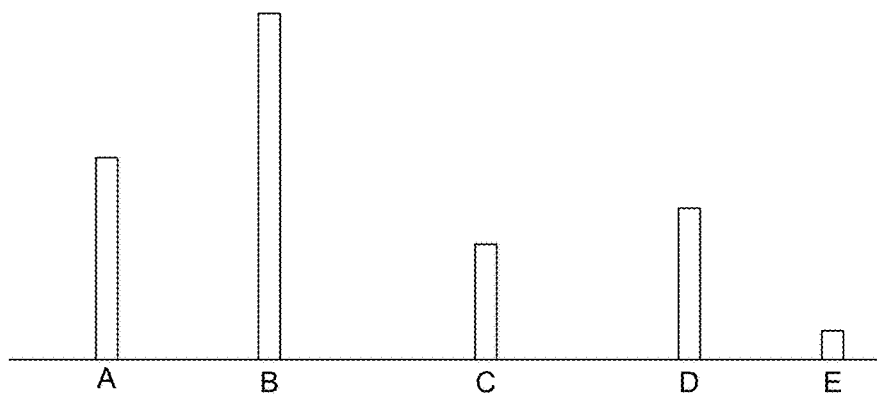
FIG. 16 illustrates an example histogram using HSG labels for a plurality of sensor element readings.
Figure 18:
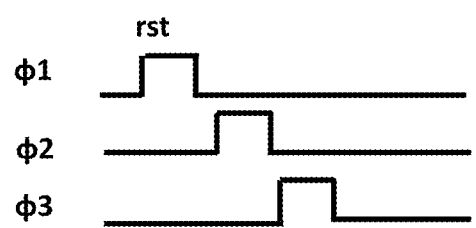
FIG. 18 represents three consecutive clock cycles—$\phi1$, $\phi2$, and $\phi3$.

As illustrated in FIG. 15B, each sensor element location from a group of sensor element locations associated with an image pixel may be associated with a label based on the quadrant determined in FIG. 15A. Therefore, if 20 sensor elements belonged to a group of sensory elements, each of those image pixels would have a label associated with them. Although the labels assigned in FIG. 15B are A, B, C, and D, a fifth label, "E," may also be generated. In one implementation, an "E" label may only be generated when the summation operations in FIG. 13C or FIG. 13E result in zero or close to a zero (for example, a range between −0.05 to 0.5) result for the respective axis.

The labels for each for each of the sensory elements from a group of sensory elements are used in generating a histogram for the group of sensory elements. For example, out of 20 sensory element readings associated with the frame of an image, as shown in FIG. 16, 5 image pixels may be labeled as "A," 8 image pixels may be labeled as "B," 3 image pixels may be labeled as "C," 4 image pixels may be labeled as "D," and 0 image pixels may be labeled as "E."

It is to be noted that the histogram shown in FIG. 16 is not drawn to scale or based on calculated values, and simply represents a visual illustration of a histogram. The generated histogram may be used for detecting features for computer vision. For example, certain histogram patterns may represent corners, edges, etc. in the sensor readings from the sensor elements of the sensor element array.

FIGS. 17A-C illustrate the process of generating the HSG labels that represent the edges and corners detected at any given sensor element using circuitry. The HSG labels that are generated may be used to generate the histograms, as described in FIG. 16 for more complex feature detection. In essence, the histogram represents a grouping of different features represented by a group of HSB labels for a plurality of sensor readings.

FIGS. 17A-C may drastically reduce the power and increase efficiency for detecting the HSG label for any given pixel for detecting an indication of a vertical or horizontal edge for any given sensory reading. In one implementation, an adjacent micro-controller, dedicated microprocessor, or computer system may receive the HSG labels from a sensor and generate histograms from the HSG labels for more complex feature detection.

FIGS. 17A, 17B and 17C illustrate example techniques, according to embodiments of the invention, for vertical edge detection during two clock cycles $\phi 2$ and $\phi 3$ (shown in FIG. 18), respectively. From FIG. 17A to FIG. 17B, values for column C1 (7, 9 and 3) are effectively multiplied top to bottom by the unsigned gradient coefficients (0.3, 1 and 0.3) using circuits similar to circuitry described in FIG. 20 and the resultant value is stored at R2C2, as shown at R2C2 of FIG. 9B (i.e., 0.3*7+9*1*3*0.3=12). According to aspects of the disclosure, since the circuitry described in FIG. 20 performs a comparison, the sign of the gradient coefficient is implicit in the order of the comparison.

As should be noted, in comparison to FIG. 13, aspects of FIGS. 9A-C and FIG. 20 use only three unsigned gradient coefficients for each axis instead of an array of values.

Figure 20:
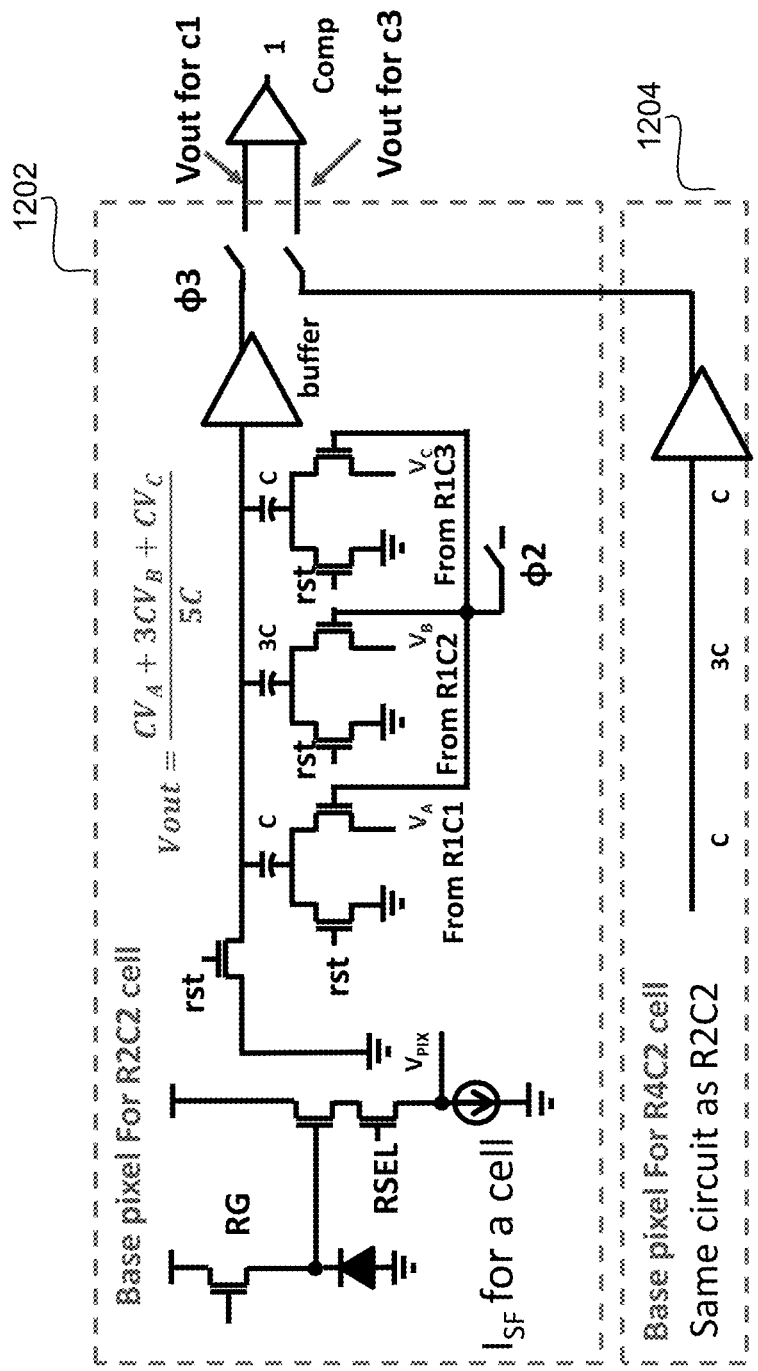
FIG. 20 illustrates an example in-pixel and/or peripheral circuitry for performing operations according to certain aspects of the disclosure.

Similarly, the values at column C2 (8, 5 and 4) and C3 (6, 3 and 2) are also effectively multiplied top to bottom by the gradient coefficients (0.3, 1 and 0.3) using circuits similar to circuitry described in FIG. 20 and the resultant values are stored at R2C3 (8*0.3+5*1+5*0.3=8.9) and R2C4 (6*0.3+3*1+2*0.3=5.4), respectfully.

Although values for all three columns are shown as being calculated in FIG. 17B, only the resultant value for the weighted sum from column C1 and Column C3 are needed for determining the gradient Gx at R2C2 for determining the label for R2C2. As shown in FIG. 17C, at $\phi 3$, a comparison is performed between the weighted sum of the values for C1 (i.e., 12) and the weighted sum of the values for C3 (i.e., 5.4) to derive the x component for the quadrant (as shown in FIG. 15A or 15B) for the label for R2C2. As shown in FIG. 17C, the described comparison negates the need for explicitly generating the signed summation, since the sign is implicit in the comparison performed. Since 12 is greater than 5.4, the logic comparison in FIG. 9C results in a logical result of "1." The weighted sum for column C2, although generated at the same time as C1 and C3, may be used for generating the HSG label for R2C3.

FIG. 20 illustrates an example of the circuitry that may be used for calculating the weighted sums of the columns in FIGS. 17A, 17B and 17C. It should be noted that, although FIGS. 17A, 17B and 17C only show the calculation for the Gx component, similar calculations may also be performed for the rows for calculating the Gy component for determining the label associated with the sensor element reading for any given sensor element.

Figure 19:
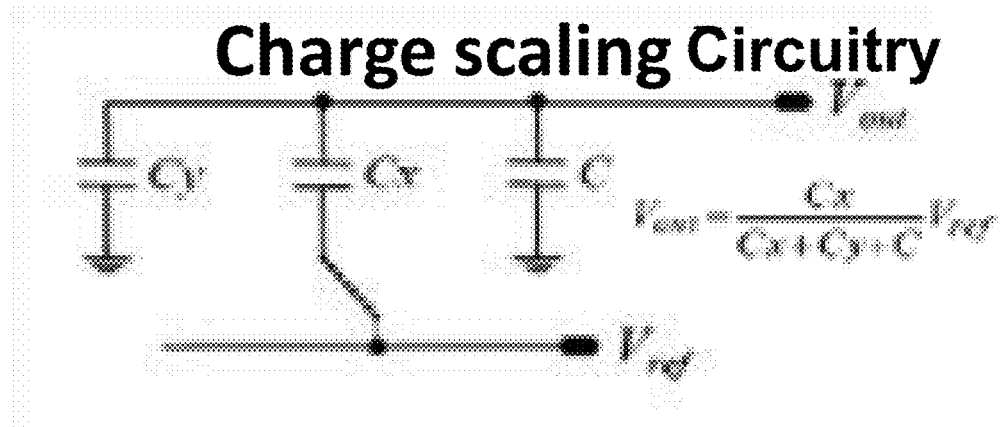
FIG. 19 provides an example implementation of a charge scaled circuitry that may be used in aspects of the current disclosure.

The circuitry in FIG. 20 may be implemented using circuitry similar to charge scaling circuitry for calculating the weighted sums of the respective rows or columns of sensor readings for sensor elements. Although circuitry similar to charge scaling circuitry may be used in implementing the circuitry shown in FIG. 20, the circuitry shown in FIG. 20 may be used for a purpose different from the traditionally intended purpose for a charge scaling circuitry for performing digital to analog conversions. Example charge scaling circuitry is shown in FIG. 19 with three capacitors and switches.

FIG. 20 illustrates generation of the x-axis gradient value for R2C2. As shown in block 2002 of FIG. 20, for calculating the weighted sum of column C1, the capacitors may be weighted by a multiple of the appropriate gradient coefficients such as 1, 3 and 1 (i.e., 3× multiple of 0.3, 1 and 0.3). Furthermore, the intensity voltage from column C1 may be applied to the circuitry. For example, intensity voltage from R1C1 is applied at Va, intensity voltage from R2C1 is applied at Vb, and intensity voltage from R3C1 is applied from Vc.

Figure 21:
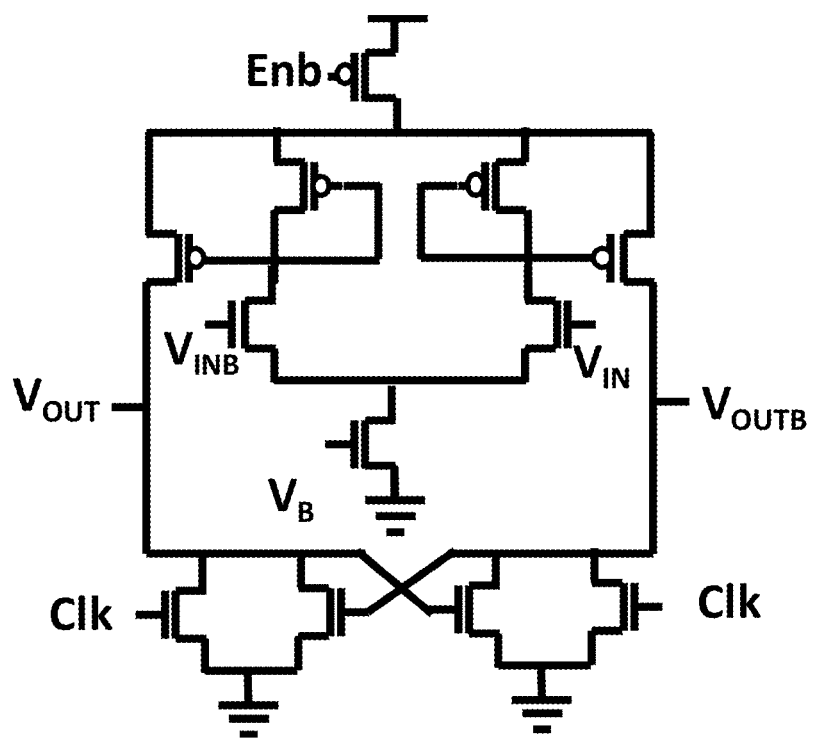
FIG. 21 provides an example implementation of a comparator that may be used in aspects of the current disclosure.

The value generated at block 2002 is the Vout for column C1 and is compared by a comparator against the Vout for column C3 generated by block 2004. Although not limited to such a circuitry, an example comparator is shown in FIG. 21. In one aspect, the circuitry can be implemented such as to leverage parallelism between weighted summations for columns and rows generated for multiple sensory elements. For example, as shown in FIG. 20, for generating the Gx for R2C2, the pixel R2C2 may only need to calculate the weighted summation of the voltage intensities from Column C1. The values for the weighted summation for Column C3 may be generated by the circuitry for R2C4, for generating its own gradient summation for x-axis, and can be reused for the comparison for R2C2. Reusing in-pixel circuitry as described herein reduces the amount of "fill-space" or area for each pixel and consequently the size of the sensor, increases power efficiency and decreases the cost of manufacturing such a sensor.

Furthermore, the same circuitry may be re-used also for calculating the gradient summation for the y-axis in a similar manner. For example, circuitry block 2002 at R2C2 may also be used for generating the weighted summation for row R1 shown in FIG. 17A. For instance, the value from R1C1 may be applied at Va, the value from R1C2 may be applied at Vb, and the value from R1C3 may be applied at Vc, generating the weighted sum of the values from row R1 shown in FIG. 17A. Similarly, the values for R3 may be generated by R4C2 and compared against value generated for R1.

Therefore, as shown in FIG. 20, each in-pixel circuitry (such as block 2002 for R2C2) may generate the weighted sums for the gradient values for the x-axis and the y-axis for each sensory element by merely calculating the weighted summation of three values for one column or one row, respectively. In one implementation, as shown in FIG. 20, the comparator logic that uses input from different in-pixel circuitry associated with different pixels may be implemented in the peripheral circuitry.

Although, FIG. 20 illustrates a particular implementation of in-pixel circuitry and peripheral circuitry, several other variations that divide the circuitry between the in-pixel circuitry and the peripheral circuitry may be implemented without deviating from the scope of the invention. For example, in one implementation, all of the circuitry may be implemented in-pixel or in the peripheral. In another implementation, the weighted sums of the columns and rows may be calculated simultaneously, by implementing two blocks similar to block 2002 for each pixel for parallel calculations of the weighted sums for the rows and columns. Such a variation may increase the space for implementing the circuitry, while reducing the time needed for generating the HSG labels associated with each sensory element.

Aspects of the invention enable performing CV operations, such as generation of the HSG labels using dedicated CV computation hardware on the sensor, either in-pixel circuitry, peripheral circuitry, dedicated CV processing module or some combination thereof instead of performing these operations on a processor in the digital domain. Performing CV operations on an application processor may be power- and processing-intensive. Furthermore, detecting features by performing CV operations, such as generation of HSG labels, on the processor may be power- and processing-intensive, since performing CV on the processor requires storing of information from the sensors in memory, triggering processing of the sensor information, fetching of instructions from memory for CV computations, and storing the results.

FIG. 21 provides an example implementation of a comparator for multiple values. The comparator may compare two voltages or currents and outputs a digital signal indicating which of the two are larger (or smaller). The comparator may have one or more pre-determined and/or configurable threshold for performing comparisons. The comparator shown in FIG. 21 is an example of a voltage comparator.

Although aspects described in this disclosure discuss detecting vertical and horizontal edges, diagonal edges may also be detected and processed similar to what has been described above, without deviating from the scope of the invention.

Hardware Acceleration of FAST Corner Detection Computations for CV Features

Features from accelerated segment test (FAST) is a corner detection method, which could be used to extract feature points and later used to track and map objects for many CV tasks. FAST corner detector is generally suitable for real-time video processing application because of high-speed performance.

Figure 22:
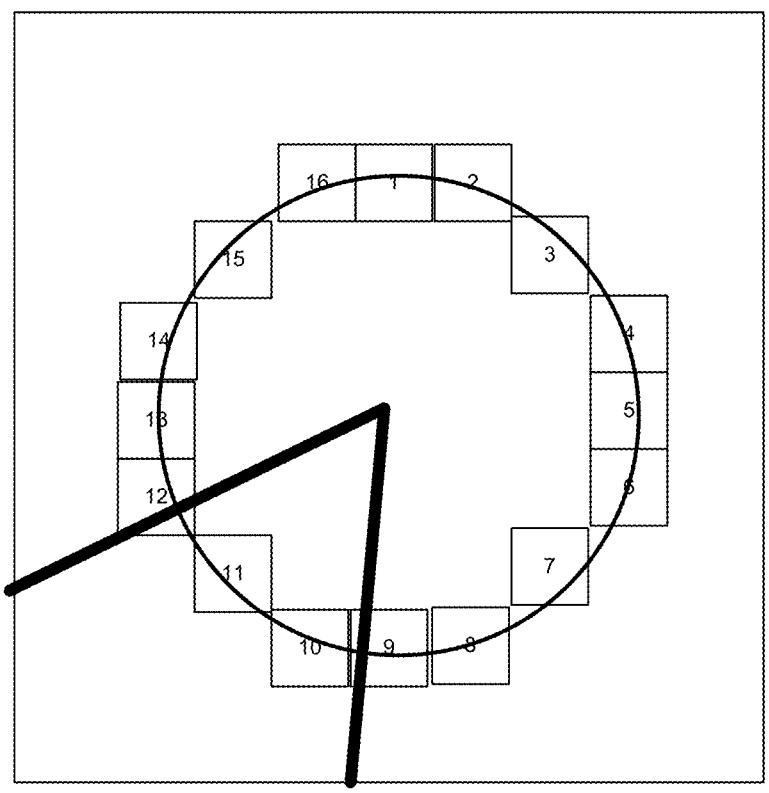
FIG. 22 illustrates a Bresenham circle for detecting features using features from accelerated segment test (FAST) corners.

Generally, as shown in FIG. 22, FAST corner detector uses a circle of 16 pixels (a Bresenham circle of radius n) from an image to classify whether a candidate point p is a corner. Each pixel in the circle is labeled from integer number 1 to 16 clockwise. If a set of N contiguous pixels in the circle are all brighter than the intensity of candidate pixel p (denoted by Ip) plus a threshold value t or all darker than the intensity of candidate pixel p minus threshold value t, then p is classified as corner. N is usually selected as 12.

A high-speed test method could be applied to exclude non-corner points. The high-speed test for rejecting non-corner points is operated by examining 4 example pixels, namely pixel 1, 9, 5 and 13. Because there should be at least 12 contiguous pixels that are whether all brighter or darker than the candidate corner, so there should be at least 3 pixels out of these 4 example pixels that are all brighter or darker than the candidate corner. Firstly pixels 1 and 9 are examined, if both 1 and 9 are within Ip+t and Ip−t, then candidate p is not a corner. Otherwise pixels 5 and 13 are further examined to check whether three of them are brighter than Ip+t or darker than Ip−t. If there exists 3 of them that are either brighter or darker, the rest pixels are then examined for final conclusion.

Although, N is usually selected as 12, in some instances an N of 9 may lead to better tracking performance across frames.

As shown in FIG. 23, detecting corners using FAST corner detection in software may take anywhere from a few milliseconds to several milliseconds for an image on a general purpose processor like the x86 processors by manufactured by AMD® and Intel®.

Aspects of the disclosure discuss techniques for rapidly detecting corners using an optimized hardware implementation. In some instances, the CV computation hardware discussed previously also comprises configurable hardware for detecting corners using FAST corner detection. The thresholds may be built into the comparators. Several pixels, either serially or in parallel with each other, or as groups may be compared against intensity of the center pixel and the respective thresholds and processed at high speeds accordingly.

Figure 24:
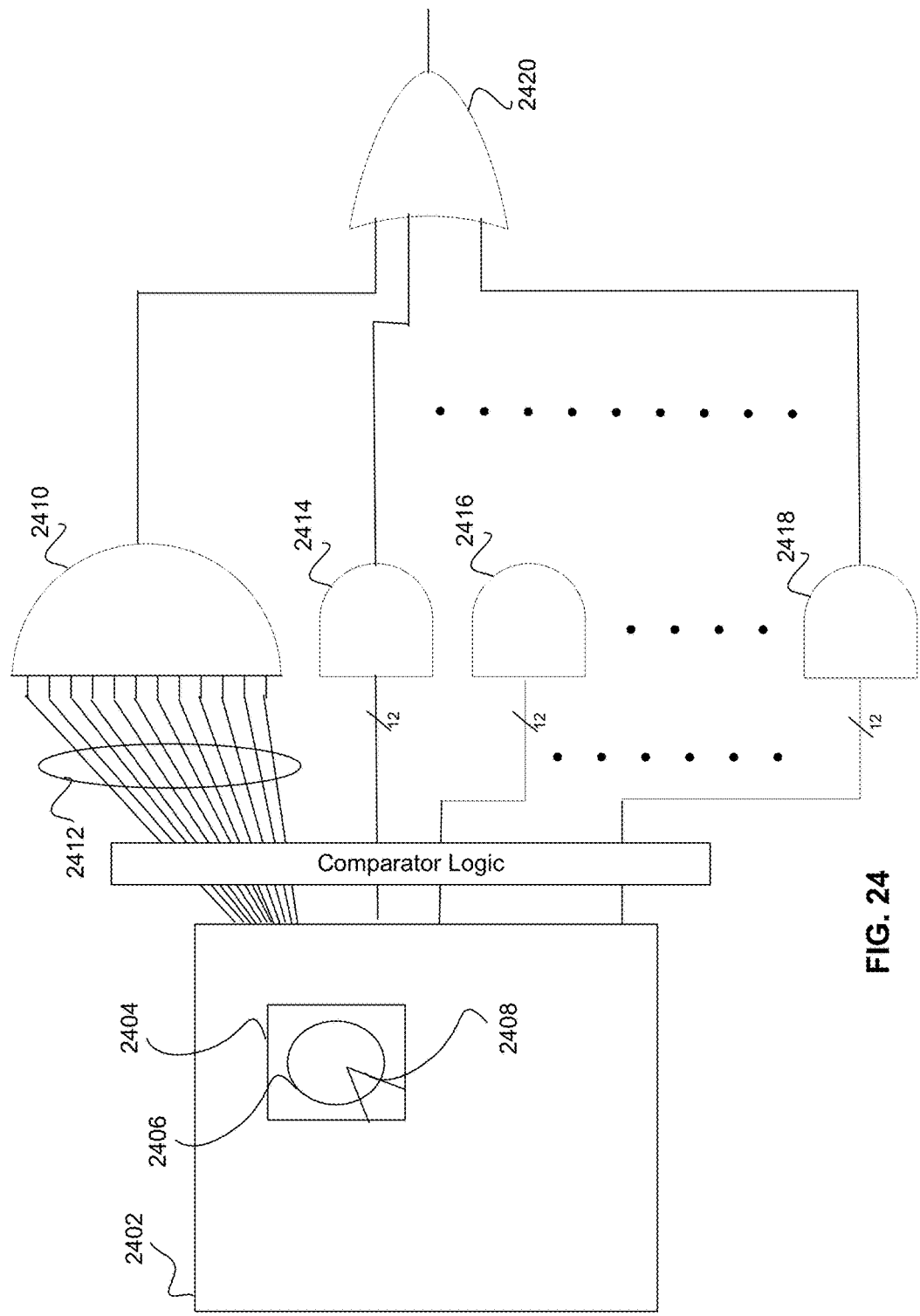
FIG. 24 illustrates an example hardware implementation for detecting FAST corners

FIG. 24 discloses an example hardware implementation for detecting FAST corners using comparator logic, AND gates and NOR gates. Several other digital or analog components may be used in variations of this implementation without deviating from the scope of the disclosure. FIG. 24 discloses a sensor array 2402 that senses an image. In certain embodiments, the image may be processed in sub-sensed sliding window arrays 2404. FIG. 24 also depicts a Bresenham circle 2406 and a corner 2408 in the sliding window array 2404. In one example embodiment, each Bresenham circle comprising 16 pixel intensity readings results in 16 different contiguous pixel groups (with N contiguous pixel intensities). FIG. 24 discloses an example N of 12 that results in 16 different contiguous pixel groups with each group comprising intensities for 12 contiguous pixels. Referring back to FIG. 22, example 16 groups would include groups comprising pixel intensities from pixels 1-12, 2-13, 3-14 . . . 16-11.

At the comparator logic 2422, the intensity of each pixel is compared against the intensity of the center pixel, offset by a pre-determined threshold value. The pre-determined threshold value may be pre-configured or determined dynamically after power-on but before the comparison operation. The comparator values resulting from the comparison at the comparator logic 2422 for each contiguous pixel group is AND'ed together through a corresponding N-input AND gate. Although not shown in their entirety, FIG. 24 represents 16 12-input AND gates for ANDing the resultant comparator values together for each contiguous pixel group. For example, AND gate 2410 ANDs together the resultant comparator values 2412 for contiguous pixels 1-12. If darker than the center pixel minus a threshold (Ip−t) was represented by a "1" and if brighter than center pixel plus the threshold (Ip+t) was represented by a "0" and if all the resultant comparator values 2412 are "1," result of the AND gate 2410 will be "1." An input of "1" from AND gate 2410 to the OR gate 2420 also results in an output of "1" from the OR gate 2420 regardless of the other inputs to the OR gate 2420. Therefore, all "1's" as resultant comparator values 2412 may result in detecting a corner in the sliding window array 2404. Similarly, a resultant "1" from any of the AND gates (2414, 2416, . . . , 2418) would result in a detection of a corner.

Such a hardware implementation of the comparisons may result in a significant speed-up in corner detection. For example, when compared with the times in FIG. 23, an implementation similar to the implementation of FIG. 24 results in corner detection in a matter of few cycles or as soon as the values are latched in (in non-clocked logic).

It should be noted, that the embodiment disclosed in FIG. 24 is an example of a hardware implementation of the FAST corner detection and is not meant to limit the scope of the disclosure. For example, a different set of gates or integrated circuitry may be used to effectuate a similar result without deviating from the scope of the invention. Furthermore, the signals may be laid out in various configurations to optimize the use of space and wiring. For example, the resultant values for each comparison from the comparator logic 2422 may feed into multiple AND gates. For instance, the comparison between the intensity of the center pixel and the 12$^{th}$ pixel may feed into 12 of the 16 AND gates. The same/similar logic may be used twice to perform the corner detection for pixels brighter than the center pixel and pixels darker than the center pixel.

Furthermore, 16 AND gates illustrated in FIG. 24 may be consolidated using larger integrated circuits with more number of inputs or larger number of integrated circuits with smaller number of inputs without deviating from the scope of the disclosure. In addition, although FIG. 24 discusses an N of 12, in certain embodiments N may be configurable to a different value.

According to one or more aspects, any and/or all of the methods and/or method steps described in FIGS. 1-24 herein may be implemented by and/or in a sensor apparatus, such as a light sensor apparatus. In one embodiment, one or more of the method steps discussed may be implemented by a sensing element and processing logic of the sensor apparatus, such as in-pixel circuitry and/or peripheral circuitry. Additionally, or alternatively, any and/or all of the methods and/or method steps described herein may be implemented in computer-readable instructions, such as computer-readable instructions stored on a computer-readable medium, such as the memory, storage or another computer-readable medium.

Figure 25:
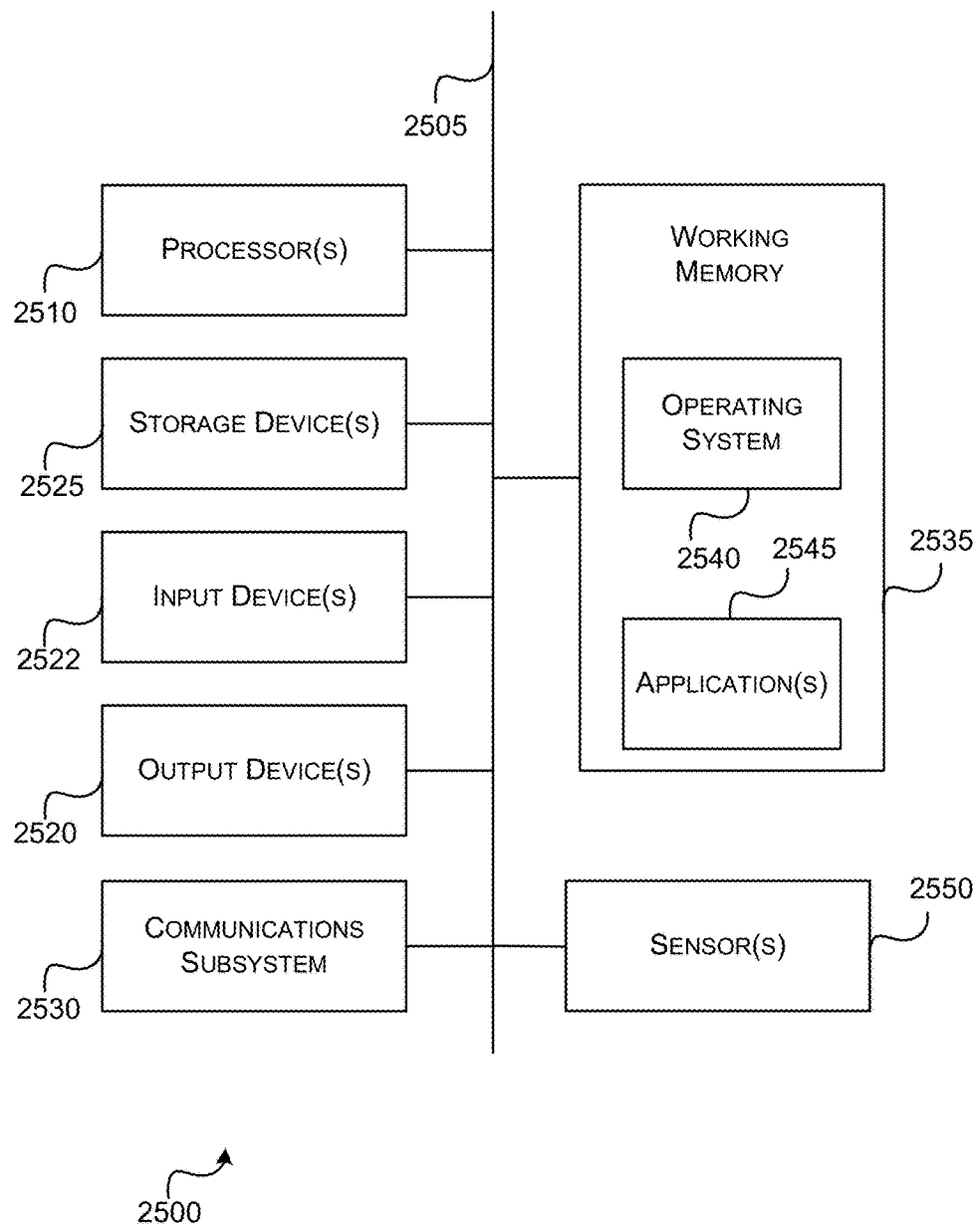
FIG. 25 illustrates an example of a computing device in which one or more embodiments may be implemented.

FIG. 25 illustrates an example computing device incorporating parts of the device and sensor 100 employed in practicing embodiments of the invention. For example, computing device 2500 may represent some of the components of a mobile device or any other computing device. Examples of a computing device 2500 include, but are not limited to, desktops, workstations, personal computers, supercomputers, video game consoles, tablets, smart phones, laptops, netbooks, or other portable devices. FIG. 25 provides a schematic illustration of one embodiment of a computing device 2500 that may perform the methods provided by various other embodiments, as described herein, and/or may function as the host computing device, a remote kiosk/terminal, a point-of-sale device, a mobile multifunction device, a set-top box and/or a computing device. FIG. 25 is meant only to provide a generalized illustration of various components, any or all of which may be utilized as appropriate. FIG. 25, therefore, broadly illustrates how individual system elements may be implemented in a relatively separated or relatively more integrated manner.

The computing device 2500 is shown comprising hardware elements that may be electrically coupled via a bus 2505 (or may otherwise be in communication, as appropriate). The hardware elements may include one or more processors 2510, including, without limitation, one or more general-purpose processors and/or one or more special-purpose processors (such as digital signal processing chips, graphics acceleration processors, and/or the like); one or more input devices 2515, which may include, without limitation, one or more cameras sensors 2550, a mouse, a keyboard and/or the like; and one or more output devices 2520, which may include, without limitation, a display unit, a printer and/or the like. Sensors 2550 module may include light sensors, olfactory sensors and/or chemical sensors. An example sensor 100 is described in FIG. 1.

The computing device 2500 may further include (and/or be in communication with) one or more non-transitory storage devices 2525, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including, without limitation, various file systems, database structures, and/or the like.

The computing device 2500 might also include a communications subsystem 2530. The communications subsystem 2530 may include a transceiver 2550 for receiving and transmitting data or a wired and/or wireless medium. The communications subsystem 2530 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 2530 may permit data to be exchanged with a network (such as the network described below, to name one example), other computing devices, and/or any other devices described herein. In many embodiments, the computing device 2500 will further comprise a non-transitory working memory 2535, which may include a RAM or ROM device, as described above.

The computing device 2500 may comprise software elements, shown as being currently located within the working memory 2535, including an operating system 2540, device drivers, executable libraries, and/or other code, such as one or more application programs 2545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer);

in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 2525 described above. In some cases, the storage medium might be incorporated within a computing device, such as computing device 2500. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 2500 and/or might take the form of source and/or installable code, which, upon compilation and/or installation on the computing device 2500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 2500 such as network input/output devices may be employed.

Some embodiments may employ a computing device (such as the computing device 2500) to perform methods in accordance with the disclosure. For example, some or all of the procedures of the described methods may be performed by the computing device 2500 in response to processor 2510 executing one or more sequences of one or more instructions (which might be incorporated into the operating system 2540 and/or other code, such as an application program 2545) contained in the working memory 2535. Such instructions may be read into the working memory 2535 from another computer-readable medium, such as one or more of the storage device(s) 2525. Merely by way of example, execution of the sequences of instructions contained in the working memory 2535 might cause the processor(s) 2510 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 2500, various computer-readable media might be involved in providing instructions/code to processor(s) 2510 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 2525. Volatile media include, without limitation, dynamic memory, such as the working memory 2535. Transmission media include, without limitation, coaxial cables, copper wire and fiber optics, including the wires that comprise the bus 2505, as well as the various components of the communications subsystem 2530 (and/or the media by which the communications subsystem 2530 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 2510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 2500. These signals, which might be in the form of electromagnetic signals, acoustic signals, optical signals and/or the like, are all examples of carrier waves on which instructions may be encoded, in accordance with various embodiments of the invention.

The communications subsystem 2530 (and/or components thereof) generally will receive the signals, and the bus 2505 then might carry the signals (and/or the data, instructions, etc., carried by the signals) to the working memory 2535, from which the processor(s) 2510 retrieves and executes the instructions. The instructions received by the working memory 2535 may optionally be stored on a non-transitory storage device 2525 either before or after execution by the processor(s) 2510.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A vision sensor comprising:
a sensor element array comprising a plurality of sensor elements, the sensor elements arranged along at least a first dimension and a second dimension of the sensor element array, each of the plurality of sensor elements capable of generating a signal based on light incident upon the sensor element; and
dedicated computer vision (CV) computation hardware capable of receiving image data from the sensor element array and configurable to serially compute CV features for one or more two-dimensional patches within the sensor element array based on signals from sensor elements in each of the one or more two-dimensional patches, the dedicated CV computation hardware including switches to allow the CV computation hardware to calculate a first type of CV feature in a first mode and to calculate a second type of CV feature in a second mode, wherein a portion of the dedicated CV computation hardware is bypassed using a bypass path to calculate the first type of CV feature or the second type of CV feature.

2. The vision sensor of claim 1, wherein the dedicated CV computation hardware is peripheral to the sensor element array.

3. The vision sensor of claim 1, wherein the first type of CV feature is a Local Binary Pattern (LBP) label.

4. The vision sensor of claim 3, wherein the second type of CV feature is a Histogram of Signed Gradients (HSG) label.

5. The vision sensor of claim 1, wherein the first type of CV feature is a first variation of an LBP label and the second type of CV feature is a second variation of an LBP label.

6. The vision sensor of claim 1, wherein the dedicated CV computation hardware is coupled to a dedicated microprocessor.

7. The vision sensor of claim 1, wherein the first type of CV feature is a feature from accelerated segment test (FAST) corner.

8. The vision sensor of claim 1, wherein the dedicated CV computation hardware is coupled to an application processor.

9. The vision sensor of claim 1, wherein the dedicated CV computation hardware comprises comparators.

10. The vision sensor of claim 1, wherein the dedicated CV computation hardware comprises circuitry for performing a weighted sum operation.

11. The vision sensor of claim 1, wherein the dedicated CV computation hardware comprises charge scaling circuitry.

12. The vision sensor of claim 1, wherein the dedicated CV computation hardware is configured to switch to a third mode for calculating the first type of CV feature and the second type of CV feature.

13. A method, comprising:
receiving sensor readings based on light incident upon a plurality of sensor elements forming a sensor element array, wherein the plurality of sensor elements are arranged along at least a first dimension and a second dimension of the sensor element array;
determining a mode to operate a dedicated computer vision (CV) computation hardware capable of receiving image data from the sensor element array and configurable to serially compute CV features for one or more two-dimensional patches within the sensor element array based on signals from sensor elements in each of the one or more two-dimensional patches, the dedicated CV computation hardware including switches to allow the CV computation hardware to calculate a first type of CV feature in a first mode and to calculate a second type of CV feature in a second mode, wherein a portion of the dedicated CV computation hardware is bypassed using a bypass path to calculate the first type of CV feature or the second type of CV feature; and
switching the dedicated CV computation hardware to the first mode or the second mode for computing the corresponding type of CV feature based on the determined mode.

14. The method of claim 13, wherein the dedicated CV computation hardware is peripheral to the sensor element array.

15. The method of claim 13, wherein the first type of CV feature is a Local Binary Pattern (LBP) label.

16. The method of claim 15, wherein the second type of CV feature is a Histogram of Signed Gradients (HSG) label.

17. The method of claim 13, wherein the first type of CV feature is a first variation of an LBP label and the second type of CV feature is a second variation of an LBP label.

18. The method of claim 13, wherein the dedicated CV computation hardware is coupled to a dedicated microprocessor.

19. The method of claim 13, wherein the first type of CV feature is a feature from accelerated segment test (FAST) corner.

20. The method of claim 13, wherein the dedicated CV computation hardware is coupled to an application processor.

21. The method of claim 13, wherein the dedicated CV computation hardware comprises comparators.

22. The method of claim 13, wherein the dedicated CV computation hardware comprises circuitry for performing a weighted sum operation.

23. The method of claim 13, wherein the dedicated CV computation hardware comprises charge scaling circuitry.

24. The method of claim 13, wherein the dedicated CV computation hardware is configured to switch to a third mode for calculating the first type of CV feature and the second type of CV feature.

25. An apparatus comprising:
means for receiving sensor readings based on light incident upon a plurality of sensor elements forming a sensor element array, wherein the plurality of sensor elements are arranged along at least a first dimension and a second dimension of the sensor element array;

means for determining a mode to operate a dedicated computer vision (CV) computation hardware capable of receiving image data from the sensor element array and configurable to serially compute CV features for one or more two-dimensional patches within the sensor element array based on signals from sensor elements in each of the one or more two-dimensional patches, the dedicated CV computation hardware including switches to allow the CV computation hardware to calculate a first type of CV feature in a first mode and to calculate a second type of CV feature in a second mode, wherein a portion of the dedicated CV computation hardware is bypassed using a bypass path to calculate the first type of CV feature or the second type of CV feature; and means for switching the dedicated CV computation hardware to the first mode or the second mode for computing the corresponding type of CV feature based on the determined mode.

26. The apparatus of claim 25, wherein the first type of CV feature is a Local Binary Pattern (LBP) label.

27. The apparatus of claim 26, wherein the second type of CV feature is a Histogram of Signed Gradients (HSG) label.

28. A non-transitory computer-readable storage medium, wherein the non-transitory computer-readable storage medium comprises instructions executable by a processor for:

processing received sensor readings, the received sensor readings being based on light incident upon a plurality of sensor elements forming a sensor element array, wherein the plurality of sensor elements are arranged along at least a first dimension and a second dimension of the sensor element array;

determining a mode to operate a dedicated computer vision (CV) computation hardware capable of receiving image data from the sensor element array and configurable to serially compute CV features for one or more two-dimensional patches within the sensor element array based on signals from sensor elements in each of the one or more two-dimensional patches, the dedicated CV computation hardware including switches to allow the CV computation hardware to calculate a first type of CV feature in a first mode and to calculate a second type of CV feature in a second mode, wherein a portion of the dedicated CV computation hardware is bypassed using a bypass path to calculate the first type of CV feature or the second type of CV feature; and switching the dedicated CV computation hardware to the first mode or the second mode for computing the corresponding type of CV feature based on the determined mode.

* * * * *